US012759053B2

(12) United States Patent
Johansson et al.

(10) Patent No.: US 12,759,053 B2
(45) Date of Patent: Oct. 13, 2026

(54) METAL CUTTING TURNING METHOD

(71) Applicant: AB SANDVIK COROMANT, Sandviken (SE)

(72) Inventors: Adam Johansson, Sandviken (SE); Ronnie Lof, Sandviken (SE); Krister Wikblad, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 609 days.

(21) Appl. No.: 18/267,208

(22) PCT Filed: Nov. 3, 2021

(86) PCT No.: PCT/EP2021/080451
§ 371 (c)(1),
(2) Date: Jun. 14, 2023

(87) PCT Pub. No.: WO2022/128238
PCT Pub. Date: Jun. 23, 2022

(65) Prior Publication Data

US 2024/0058871 A1 Feb. 22, 2024

(30) Foreign Application Priority Data

Dec. 15, 2020 (EP) .................................... 20214135

(51) Int. Cl.
*B23B 1/00* (2006.01)

(52) U.S. Cl.
CPC ..................................... *B23B 1/00* (2013.01)

(58) Field of Classification Search
CPC .... B23B 5/08; B23B 5/10; B23B 5/12; B23B 5/16; B23B 5/167; B23B 5/40;
(Continued)

(56) References Cited

U.S. PATENT DOCUMENTS 3,455,189 A * 7/1969 Sweet ..................... B23B 29/24 82/158
4,223,576 A * 9/1980 Donnelly ................ B23B 27/04 82/47

(Continued)

FOREIGN PATENT DOCUMENTS

CN 103203479 A * 7/2013 ......... B23B 27/1614
CN 104858457 A * 8/2015 ............. B23B 27/00

(Continued)

*Primary Examiner* — Nicole N Ramos
(74) *Attorney, Agent, or Firm* — Corinne R. Gorski

(57) ABSTRACT

A turning method for a CNC-lathe includes providing a metal work piece and a turning tool having a coupling portion, a first cutting element having a first cutting edge and a second cutting element having a second nose cutting edge separating and connecting a second forward cutting edge and a second rearward cutting edge. The method includes moving the turning tool in a first direction such that the first cutting edge is in cut, moving the turning tool in a direction such that the first cutting edge is moved away from the metal work piece and the second nose cutting edge is moved towards the metal work piece, and moving the turning tool in a second direction such that the second forward cutting edge is in cut at a second entering angle, which is 5-45°, the second direction being in the opposite direction to the first direction.

15 Claims, 12 Drawing Sheets

(58) Field of Classification Search
CPC .... B23B 5/46; B23B 1/00; B23B 3/26; B23B 3/265; B23B 3/36; B23B 29/043; B23B 29/04; B23B 2210/02; B23B 2220/12; B23B 2220/00; B23B 2220/44; B23B 2220/445; B23B 2220/40; B23B 2270/54
See application file for complete search history.

(56) References Cited

U.S. PATENT DOCUMENTS 5,653,152 A * 8/1997 Oles .......................... B23B 5/12
408/1 R
7,086,315 B1 * 8/2006 Beiser ..................... B23B 29/24
82/99.1
2014/0251096 A1 9/2014 Hankey

FOREIGN PATENT DOCUMENTS

| | | | | | |
|---|---|---|---|---|---|
| DE | 10317344 | A1 | * | 11/2004 | .............. B23P 13/00 |
| EP | 1317981 | A1 | | 6/2003 | |
| EP | 3536428 | A1 | | 9/2019 | |
| KR | 20060121472 | A | * | 11/2006 | ........... B23D 13/005 |
| KR | 20200031891 | A | * | 3/2020 | ............. B23Q 37/00 |
| WO | WO-2004022288 | A2 | * | 3/2004 | ........... B23B 29/242 |

* cited by examiner

Fig. 7
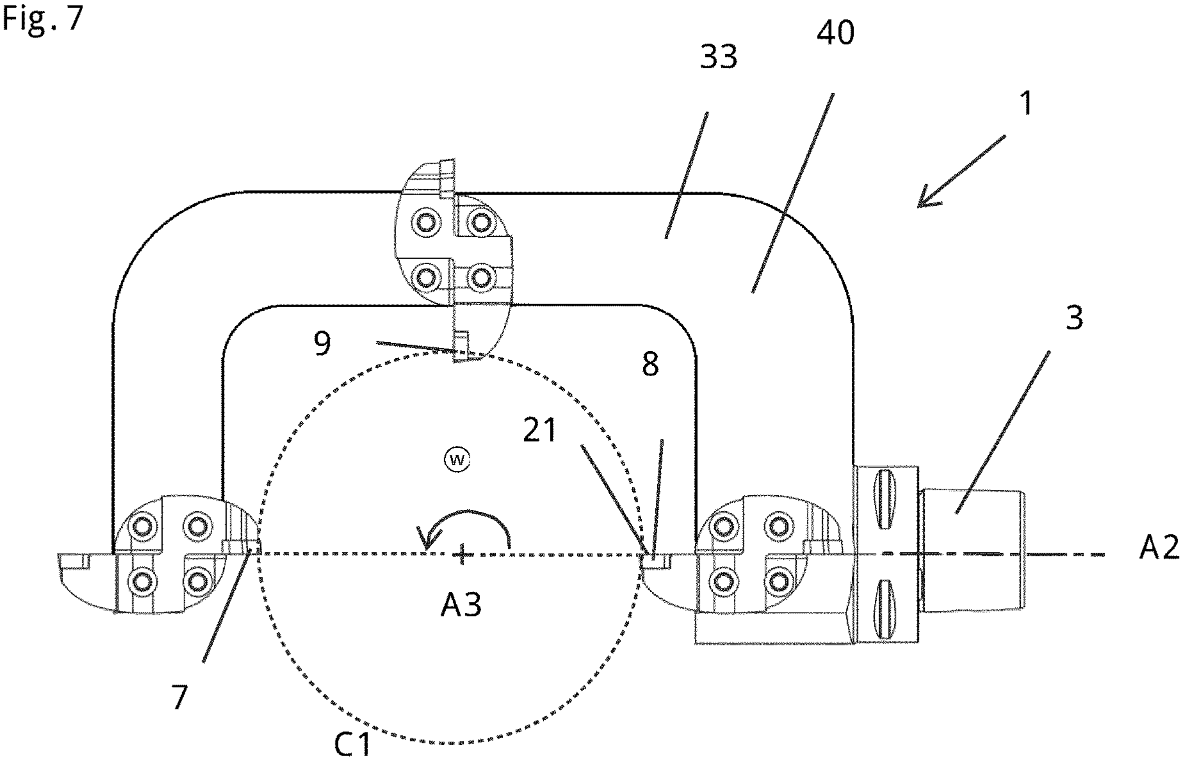
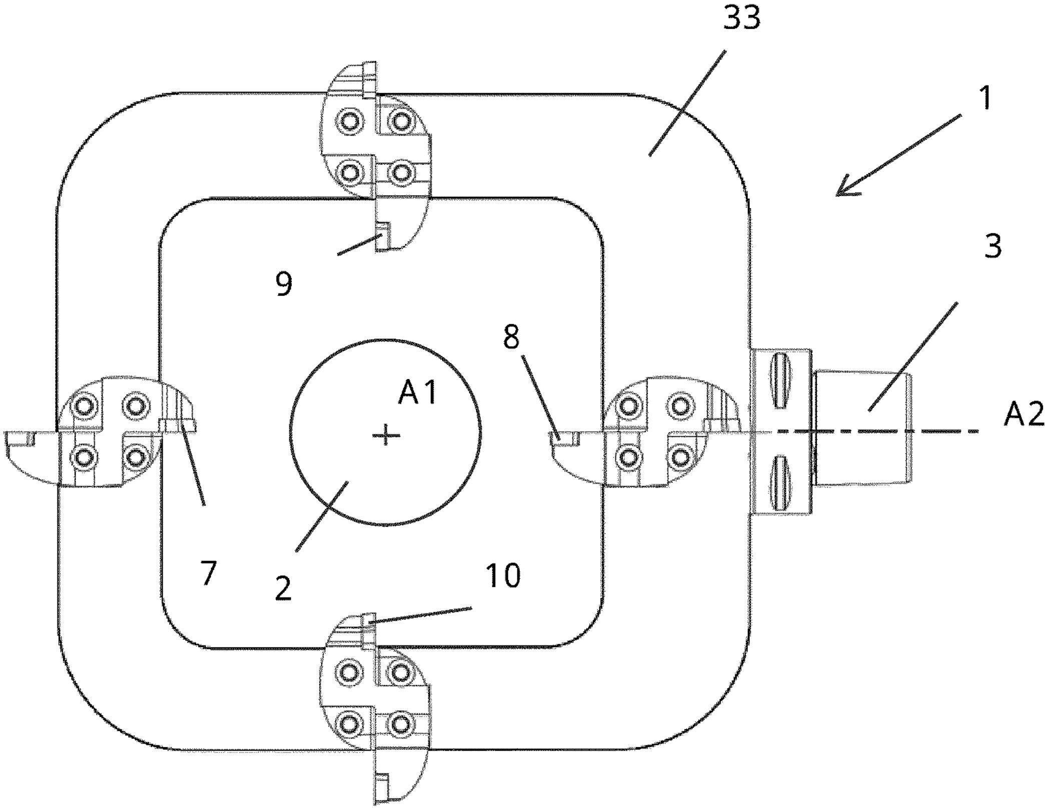
Fig. 8

Fig. 9
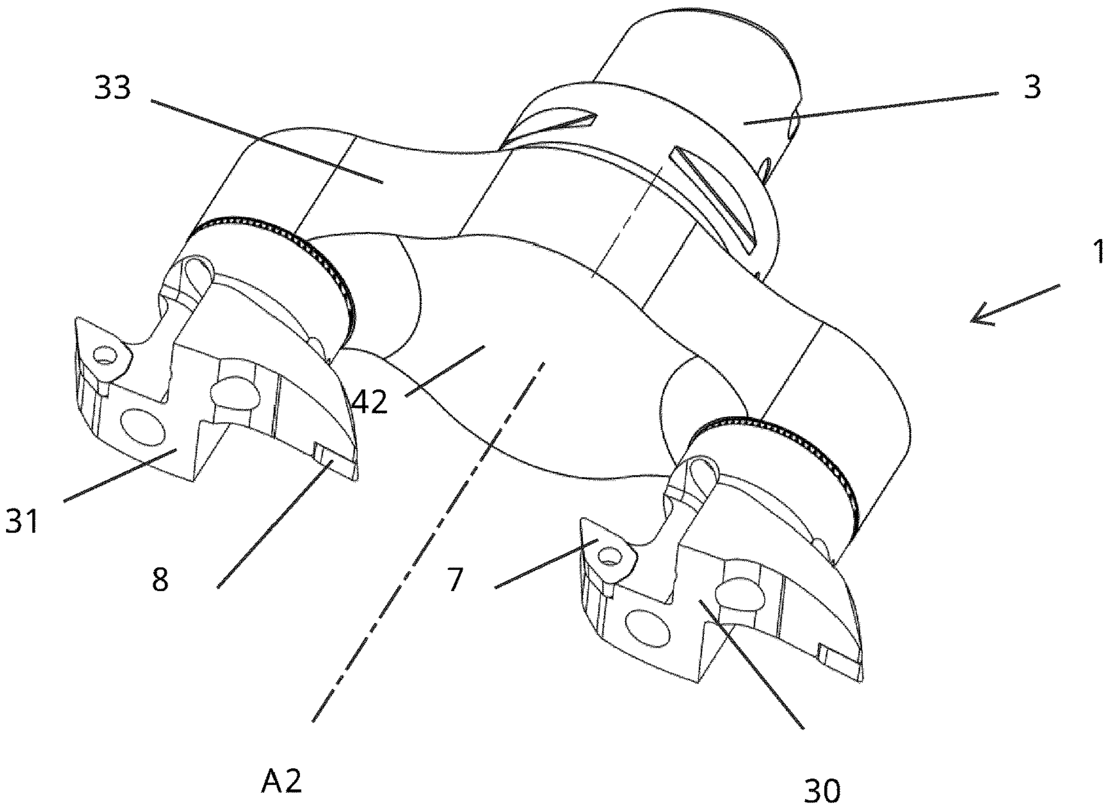
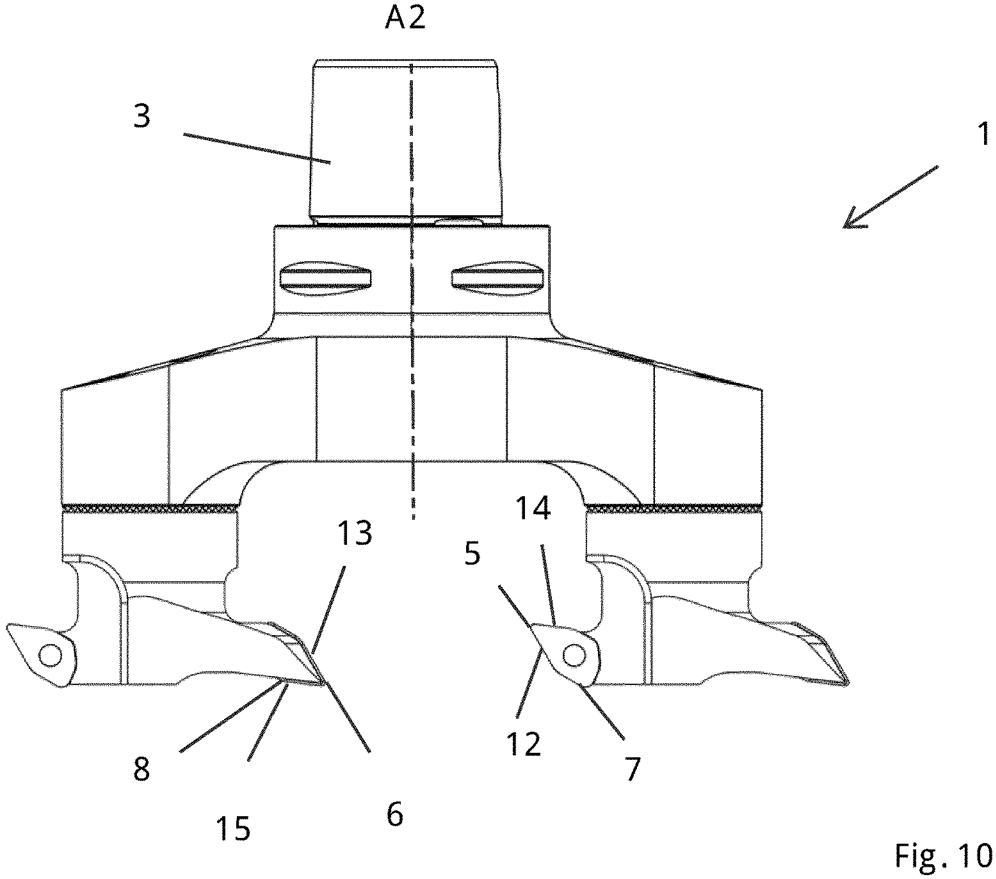
Fig. 10

Fig. 11
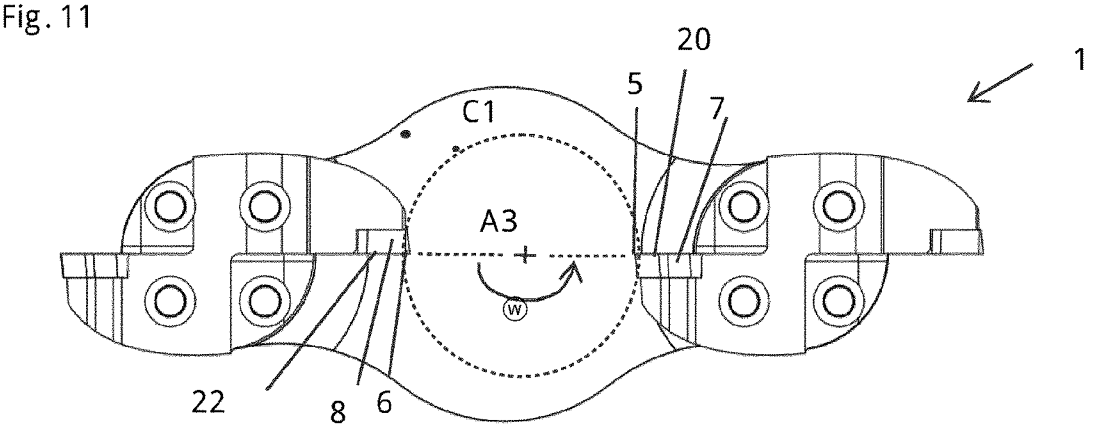
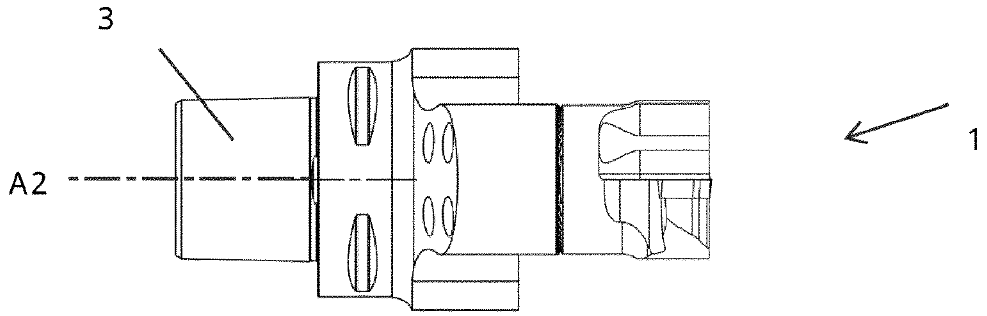
Fig. 12
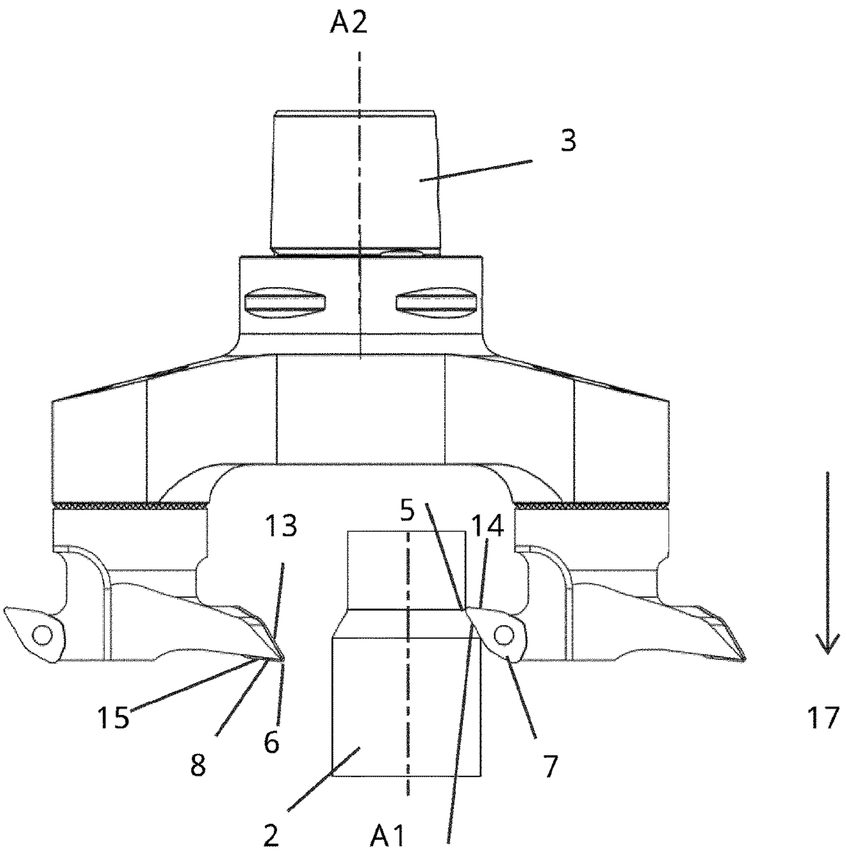
Fig. 13

Fig. 18
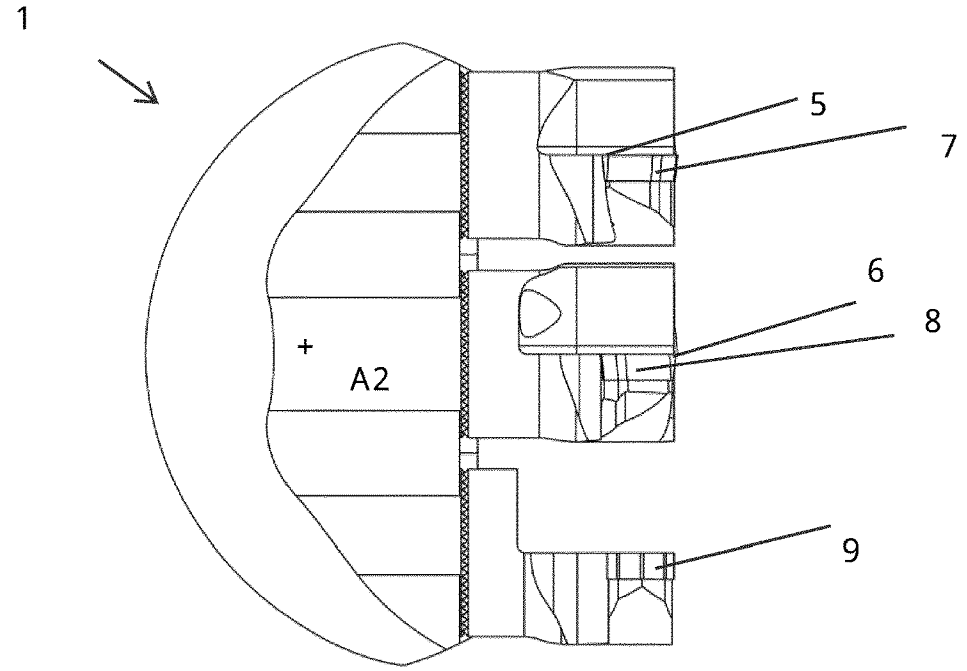
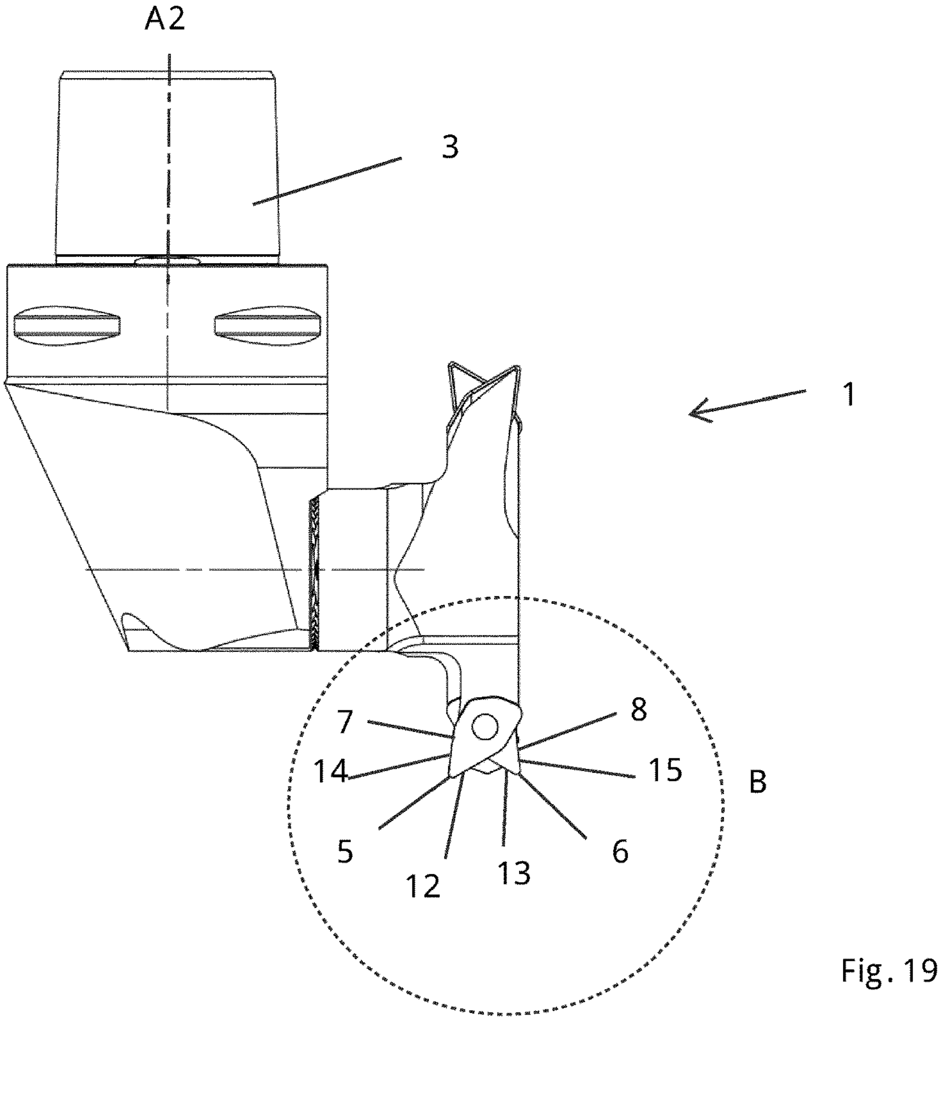
Fig. 19

METAL CUTTING TURNING METHOD

RELATED APPLICATION DATA

This application is a § 371 National Stage Application of PCT International Application No. PCT/EP2021/080451 filed Nov. 3, 2021 with priority to EP 20214135.4 filed Dec. 15, 2020.

TECHNICAL FIELD OF THE INVENTION

The present invention belongs to the technical field of metal cutting. More specifically the present invention belongs to the field of turning.

BACKGROUND OF THE INVENTION AND PRIOR ART

The present invention refers to a turning method for a CNC-lathe.

In metal cutting, turning is a common operation. CNC-lathes are commonly used. Normally, a complex shaped is machined from a metal work piece. To achieve the complex shape, it is common to use two or more turning tools, where the turning tools have different geometrical shape or different orientation. For example, one turning tool can be suitable in machining in one direction, and a second turning tool can be suitable to machine in a different direction.

Conventionally, each turning tool is equipped with one turning insert. After turning using one turning insert, normally the first turning tool is indexed to a second turning tool. For example, the CNC-lathe may comprise a turret, and the indexing from one turning tool to a second turning tool is achieved by rotation of the turret by a predetermined angle. Indexing by rotation of a turret takes time, depending e.g. on the CNC-lathe. The time where there is no cutting, such as when changing or indexing from one tool to another can be called down-time.

EP 1 317 981 A1 disclose a tool carrying a plurality of turning inserts, whereby switching between different turning inserts can be achieved quickly by means of rotation of the turning tool around a coupling axis.

The inventors have found that there is a need for a further improved method for turning.

SUMMARY OF THE INVENTION

It is an object of the invention to provide an improved turning method, especially a turning method where at least two cutting elements are used one after another, where the down-time is reduced. A further object is to provide a method which can be applied on a wide number of CNC-lathes, especially CNC-lathes where the turning tool can not rotate around a center axis thereof. A still further object is to provide a method where a complex shape can be machined in a more effective manner. A still further object is to reduce the number of turning tools, which is done by using only one turning tool in-stead of two or more turning tools. A still further object is to improve the way to machine components of complicated shape with a single turning tool.

At least one of said objectives is achieved by a turning method for a CNC-lathe, comprising the steps of: providing a metal work piece, providing a turning tool, wherein the turning tool comprises a coupling portion, wherein the coupling portion extends along a coupling axis, wherein the turning tool comprises a first cutting element and a second cutting element, wherein the first cutting element comprises a first cutting edge, wherein the second cutting element comprises a second nose cutting edge separating and connecting a second forward cutting edge and a second rearward cutting edge;

rotating the metal work piece in one direction around a rotational axis thereof; moving the turning tool in a first direction such that the first cutting edge is in cut, moving the turning tool in a direction such that the first cutting edge is moved away from the metal work piece and such that the second nose cutting edge is moved towards the metal work piece; moving the turning tool in a second direction such that the second forward cutting edge is in cut at a second entering angle which is 5-45°, wherein the second direction is in the opposite direction or substantially opposite direction to the first direction.

The turning method is for a CNC-lathe i.e. a computer- or computerized numerical control lathe, i.e. any CNC-machine suitable for turning such as e.g. a turning lathe, a multitask machine, a turn-mill machine, or a sliding head machine. A metal work piece is provided.

The metal work piece comprises an external surface, which is a radially outer surface. The radially outer surface is facing away from the rotational axis. The turning method is for turning of the radially outer surface, i.e. external turning. The metal work piece extends between a first end and a second end. The metal work piece is clamped by clamping means. The clamping means holds the metal work piece and are at least partially controlled and driven by a motor or a spindle.

The clamping means may be in the form of a collet chuck, a face driver, or a 3-jaw chuck, and may comprise a tail stock. The head-stock end of the machine is preferably located at the first end of the metal work piece. A second end of the metal work piece, opposite to the first end of the work piece, may be a free end. Alternatively, the second end is in contact with a tailstock or a second chuck.

A turning tool is provided. The turning tool comprises a forward end and an opposite rear end in the form of a coupling portion. The coupling portion is connected to the CNC-lathe, more specifically to a machine interface of the CNC-lathe, such as a machine spindle or a tool revolver turret or a tool post.

The coupling portion may have a square or rectangular shape in a cross section. The coupling portion may be conical or substantially conical such as preferably according to ISO standard 26623-1. In this context, a truncated cone is a cone-like shape. In this context, the tapered portion which forms the rear part of the ISO standard 26623-1 coupling is a cone-like shape. The coupling portion is preferably conical such that said cone or cone-like shape is symmetrical or substantially symmetrical around the coupling axis. A three-fold symmetry is in this context considered to be symmetrical. A cross section area of said cone or cone like shape preferably decreases in a rearward direction. The coupling portion may be in the form of a hollow taper shank such as HSK, according to DIN 69893.

The coupling portion extends along a coupling axis or a center axis, which center axis defines a longitudinal axis of the turning tool. The length, i.e. total length, of the turning tool measured along or parallel to the coupling axis is preferably 50-400 mm, even more preferably 70-300 mm.

The turning tool comprises a first cutting element and a second cutting element. The first and second cutting elements are spaced apart. The first and second cutting elements are preferably cutting inserts or turning inserts, i.e. replaceable elements made from a wear resistant material, e.g. cemented carbide. Alternatively, the first and second cutting elements can be parts of a single wear resistant element, preferably made from a single piece of cemented carbide. The first cutting element comprises a first top surface. The first top surface comprises a rake face or a rake surface.

The first cutting element comprises a first cutting edge. The first cutting edge may preferably be in form of a nose cutting edge, i.e. a cutting edge which is convex in a top view. The first cutting edge, or a portion of the first cutting edge, generate the machined surface.

The first cutting element may be in the form of a round cutting insert, i.e. an insert which is circular or substantially circular in a top view. The radius of said circle is preferably 5-30 mm. Alternatively, the first cutting edge may be a nose cutting edge which is convex in a top view, preferably in the form of a circular arc, having a radius of curvature of 0.2-1.6 mm, and be arranged between, i.e. connecting, a first forward cutting edge, i.e a main cutting edge or a principal cutting edge or a leading cutting edge, and a first rearward cutting edge, i.e. an auxiliary cutting edge or a trailing cutting edge. The second cutting element comprises a second nose cutting edge separating and connecting a second forward cutting edge and a second rearward cutting edge. The second cutting element comprises a first top surface. The second top surface comprises a rake face or a rake surface. The second forward cutting edge is a leading cutting edge. The second rearward cutting edge is a trailing cutting edge.

The first top surface may in a top-view have a rhomb-shape, a tri-angular shape, an octagonal shape, a square shape, a round shape, or a polygon shape.

The first top surface and the second top surface may each be flat. Alternatively, one or both of said surfaces may be non-flat or non-planar. Preferably, said surfaces may comprise one or more chip breaking means, in the form of one or more protrusions and/or depressions.

The direction which the first top surface is facing is a normal to the first top surface, i.e. a direction perpendicular to the first top surface. Said direction is away from the first top surface, and away from the first bottom surface, in case the first cutting element is in the form of a cutting insert or a turning insert, having a first bottom surface.

In case the first top surface is non-flat, for the purpose of determine the direction which the first top surface is facing, such first top surface may be defined as or approximated to a plane parallel to a first mid-plane, where said plane intersects the first cutting edge, or at least a portion of the first cutting edge. Said first mid-plane is a plane mid-way between the first top surface and the first bottom surface, in case the first cutting element is in the form of a cutting insert or a turning insert, having a first bottom surface.

Alternatively said first top surface, for the purpose of determine the direction which the first top surface is facing, may be defined as a plane intersecting all nose cutting edges bordering to or adjoining the first top surface.

A corresponding reasoning applies for the second top surface and the second cutting element.

The method comprises the step of rotating the metal work piece in one direction around a rotational axis thereof. The one direction may be clock-wise or counter clock-wise.

The method includes the step of moving the turning tool in a first direction, i.e. in a first feed direction. In other words, the method includes the step of turning in a first direction.

The first direction may preferably be parallel to the rotational axis, also known as longitudinal turning. Said step is included in a first pass, which is defined as between going into cut and going out of cut. The first pass is not necessarily a movement of the first cutting element along a straight line. When turning in the first direction, the first cutting edge is in cut, i.e. is active. A machined surface is formed by the first cutting edge.

After or during going out of cut, the turning tool is moved such that the first cutting edge is moved away from the metal work piece and such that the second nose cutting edge is moved towards the metal work piece. During at least a portion of said movement, neither the first cutting element nor the second cutting element is active, i.e. no metal cutting by the first and second cutting elements during said movement.

The movement of the turning tool may be in a direction perpendicular to the coupling axis and the rotational axis. The movement of the turning tool may preferably be or include a linear movement. Said movement is preferably without rotation around the coupling axis. Thus, the method can be applied on a wide range of CNC-lathes. The movement may be in a direction which is perpendicular to or substantially perpendicular to the first top surface.

Said movement is an indexing motion. In other words, the movement is such that the first cutting element is brought to an inactive position and the second cutting element is brought to an active position, i.e. a position where the second element is suitable to cut metal from the metal work piece.

The method includes the step of moving the turning tool in a second direction. In other words, turning in a second direction. The second direction, or second feed direction, is in the opposite direction or substantially opposite to the first direction. For example, the first direction and second direction may be parallel to the rotational axis, but in opposite directions. For example, the first direction may be in a direction away from a first end of the work piece, and the second direction may be towards said first end of the work piece. Said first end may be a clamping end, i.e. the end of the work piece which is clamped by clamping means. Said step of moving the turning tool in a second direction is included in a second pass, which is defined as between going into cut and going out of cut. The second pass is not necessarily a movement of the first cutting element along a straight line. A machined surface is formed by the second nose cutting edge. The second nose cutting edge and the second forward cutting edge is active, such that the second forward cutting edge is active at an acute second entering angle. The acute second entering angle is preferably 5-45°, even more preferably 5-30°. By such an acute entering angle, the insert wear of the second cutting element is reduced, compared to if the second entering angle is greater. The second entering angle is the entering angle of the second forward cutting edge when moving the turning tool in the second direction.

The second cutting element is inactive, i.e. not cutting, in other words spaced apart from the metal work piece, when moving the turning tool in the first direction. The first cutting element is inactive, i.e. not cutting, in other words spaced apart from the metal work piece, when moving the turning tool in the second direction.

Preferably, no part of the turning tool is between the first cutting edge and the second nose cutting edge. In other words, no part of the turning tool is preferably located along a straight line connecting the first and second nose cutting edges.

According to an embodiment, the first cutting element comprises a first forward cutting edge and a first rearward cutting edge, wherein the first cutting edge is a first nose cutting edge, wherein the first nose cutting edge separates and connects the first forward cutting edge and the first rearward cutting edge, wherein when moving the turning tool in a first direction, the first forward cutting edge forms a first entering angle which is 5-45°.

By such a method, the wear of the first cutting element is reduced, compared to if the first entering angle would be greater.

The first forward cutting edge, which is a principal cutting edge or a main cutting edge, and the first rearward cutting edge, which is an auxiliary cutting edge, are each preferably straight or linear or substantially straight or substantially linear in a top view. The first nose cutting edge is convex in a top view, preferably in the form of a circular arc, preferably having a radius of curvature of 0.2-1.6 mm.

The nose angle of the first cutting element, defined as the angle between the first forward cutting edge and the first rearward cutting edge, is preferably less than or equal to 160°, even more preferably 30°80°.

The first forward cutting edge forms an acute first entering angle, said first entering angle is 5-45°, even more preferably 5-30°.

When moving the turning tool in the first direction, the first nose cutting edge and the first forward cutting edge are in cut or active.

The first and second nose cutting edges are preferably spaced apart along the rotational axis by a constant distance when turning in the first and second directions.

According to an embodiment, the method comprises the further step of moving the turning tool in the second direction such that the second rearward cutting edge forms an obtuse back clearance angle.

By such a method, a surface perpendicular to the rotational axis can be machined by the second cutting element. The method may comprise the step of moving the turning tool radially towards the rotational axis such that the second cutting element is in cut. Preferably said step is prior to the step of moving the turning tool in the second direction.

Preferably, said back clearance angle is 91°135°, even more preferably 93°120°. The sum of the entering angle, the nose angle and the back clearance angle equals 180°. This applies to both the first and second cutting elements.

According to an embodiment, the method comprises the step of moving the turning tool in the first direction such that the first rearward cutting edge forms an obtuse back clearance angle.

By such a method, a surface perpendicular to the rotational axis can be machined by the first cutting element. The method may comprise the step of moving the turning tool radially towards the rotational axis such that the first cutting element is in cut. Preferably said step is prior to the step of moving the turning tool in the first direction.

Preferably said back clearance angle is at least 91°, even more preferably 93°120°.

According to an embodiment, the method comprises the step of turning at least a portion of a surface machined when moving the turning tool in the first direction when moving the turning tool in the second direction.

By such a method, a roughing and a finishing operation can be made using only one turning tool.

The method may comprise the further step of moving the turning tool in the first direction, such that the first cutting element is in cut, and such that at least a portion of the surface machined when moving the turning tool in the second direction is machined.

The method may comprise further steps, such that the first and second cutting element is alternatively in cut in a sequence, where the first cutting element is in cut when the turning tool is moved in the first direction, and the second cutting element is in cut when the turning tool is moved in the second direction.

According to an embodiment, the step of moving the turning tool in a direction such that the first cutting edge is moved away from the metal work piece and such that the second nose cutting edge is moved towards the metal work piece, is without rotation of the turning tool around the coupling center axis.

Said movement is without rotation of the turning tool around the coupling axis, or around any other axis parallel to the coupling axis. By this, the method can be applied on a wide number CNC-machines. Said movement can be a linear movement, or the turning tool can move nonlinearly, e.g. in a circular arc, in a plane defined by two machine axii, such as the X-Z plane of the CNC-lathe. By this, the indexing time can be shorter, compared to a rotational movement. One other effect of a linear movement is that the method can be performed using CNC-lathes where there is no rotating option.

Preferably, the turning tool does not rotate around the coupling axis during the first pass, the second pass or between the first and second passes. Preferably, the turning tool does not rotate around any other axis, such as any axis parallel to the coupling axis, during or between the first and second passes. In other words, the method is preferably without any rotational movement of the turning tool.

According to an embodiment, the coupling axis is parallel to or perpendicular to the rotational axis.

By such a method, the said method can be applied on a greater number of CNC-lathes. The coupling axis is parallel to or perpendicular to the rotational axis when turning in the first and second directions, preferably during all steps of the method.

According to an embodiment, the metal work piece is clamped by clamping means, wherein a distance from the clamping means to the second nose cutting edge is shorter than a distance from the clamping means to the first cutting edge.

Said clamping means are connected to and driven by a rotating or rotatable spindle. Said clamping means may be in the form of e.g. a collet chuck, a 3-jaw chuck or a face driver. Said distance is measured along or parallel to the rotational axis.

According to an embodiment, the second nose cutting edge is in the first direction ahead of the first cutting edge when moving the turning tool in the first direction, wherein the first cutting edge is in the second direction ahead of the second nose cutting edge when moving the turning tool in the second direction.

By such a method, the more shapes can be machined, because the is less risk that an inactive cutting element interferes with the metal work piece. Ahead is to be understood as ahead in the feed direction, along the rotational axis. More specifically, the second nose cutting edge is ahead of the surface generating part of the first cutting edge when moving the turning tool in the first direction, wherein the surface generating part of the first cutting edge is ahead of the second nose cutting edge when moving the turning tool in the second direction. The surface generating part of the first cutting edge is preferably in the form of a first nose cutting edge.

According to an embodiment, the second direction is in a direction away from a corner of the metal work piece.

A corner, or a shoulder, is defined as the intersection between a first surface concentric with the rotational axis, and a second surface perpendicular to the rotational axis. The first surface may be an external surface or an internal surface, i.e. a surface inside a bore. Preferably, the first surface is an external surface, i.e. a radially external surface. Said corner is preferably a 90° corner. Said corner is preferably completely or at least partly formed by the second cutting element.

According to an embodiment, the method comprises the further step of turning in a third direction such that the second forward cutting edge is active at an obtuse third entering angle, wherein the third direction is towards the rotational axis.

By such a method, a more complicated component shape can be machined by the one turning tool. The step of turning in the third direction is preferably after turning in the first direction. The step of turning in the third direction is preferably prior to turning in the second direction. The step of turning in the third direction is preferably part of the second pass, such that the second cutting element is in cut or active continuously when turning both in the third and second directions. The second pass is thus preferably non, linear. The third entering angle is preferably at least 100°, more preferably at least 110°. The third direction is preferably perpendicular to and towards the rotational axis. When turning in the third direction a surface is formed by the second nose cutting edge.

Preferably, an external corner or external shoulder is formed by turning in the third and second directions. Said external corner is formed by two surfaces, where one first surface is cylindrical or conical, and one second surface is flat or conical. Said two surfaces are connected by a curved surface.

Preferably, said corner or shoulder is defined by a first surface concentric with the rotational axis and a second surface perpendicular to the rotational axis. The first surface may be an external surface or an internal surface, i.e. a surface inside a bore. Preferably, the first surface is an external surface, i.e. a radially external surface. The first and second surfaces are connected by a curved surface. Said curved surface is preferably in the form of a circular arc when seen in a plane comprising the rotational axis. Said circular arc has a radius which is greater than or equal to the radius of the second nose cutting edge.

The first direction is preferably in a direction towards a corner, i.e. said corner. In other words, the first pass is in a direction towards a would be corner, preferably a corner which is finished after the second pass. The first pass thus comprises a roughing of a corner, i.e. removing some but not all material for a desired or predefined shape.

According to an embodiment, the first cutting element is a first turning insert, wherein the second cutting element is a second turning insert, wherein the first turning insert comprises a first top surface and a first bottom surface, wherein the first top surface and the first bottom surface are connected by a first side surface, wherein the second turning insert comprises a second top surface and a second bottom surface, wherein the second top surface and the second bottom surface are connected by a second side surface, wherein the first top surface and the second top surface comprises chip breaking means.

The first turning insert comprises the first cutting edge, the first forward cutting edge and the first rearward cutting edge. The second turning insert comprises the second nose cutting edge, the second forward cutting edge and the second rearward cutting edge.

The first top surface comprises a rake surface. The second top surface comprises a rake surface. Each of the first and second bottom surfaces comprises a seating surface or a contact surface.

Preferably, a first through hole for a first screw intersects the first top and first bottom surfaces.

Preferably, a second through hole for a second screw intersects the second top and first bottom surfaces.

The chip breaking means may be in the form of one or more protrusions and/or depressions. Said one or more protrusions and/or depressions are preferably arranged to control or break chips. Said protrusions preferably protrude above the cutting edge bordering the top surface, when the insert is seen in a side view. Chip breaking means improves chip breaking in turning.

According to an embodiment, the coupling portion is square or rectangular in a cross section or comprises a conical or substantially conical portion.

Said cross section is in a plane perpendicular to the coupling axis. The coupling portion preferably comprise a conical or substantially conical portion and a ring-shaped portion, such as preferably in the form of a polygonal hollow taper interface with a flange contact surface, such in accordance to ISO 26623-1:2014, or a hollow taper with a flange contact surface such as in accordance to DIN 69893, ISO 12164-1 or ISO 12164-1F.

According to an embodiment, the method comprises the further step of arranging the turning tool such that the metal work piece is between the first cutting edge and the second nose cutting edge.

By such a method, the indexing between the first and second element can be made through a linear movement along the coupling axis. Such a method can be used on a high number of CNC-lathes. The metal work piece is thus between the first cutting edge and the second nose cutting edge when turning in the first direction, and when turning in the second direction.

Preferably, the rotational axis is between or substantially between the first cutting edge and the second nose cutting edge. In other words, the turning in the first direction with the first cutting element and the turning in the second direction with the second cutting element are on opposite sides in relation to the rotational axis of the metal work piece. Preferably, a rake face associated with the first cutting edges and a rake face associate with the second cutting edges are facing in opposite or substantially directions.

According to an aspect of the invention, there is provided a computer program having instructions which when executed by a CNC-lathe causes the CNC-lathe to perform the steps according to any of the preceding methods.

Said computer program, or computer program product, may be included in a CAM-software product, i.e. a software for computer-aided manufacturing. Said computer program may be in the form a computer readable medium such as a USB-stick, a CD-ROM or a data stream.

DESCRIPTION OF THE DRAWINGS

The present invention will now be explained in more detail by a description of embodiments of the invention and by reference to the accompanying drawings.

FIG. 7 is a side view of a turning tool according to a second embodiment.

FIG. 8 is a side view of a turning tool according to a third embodiment and a metal work piece.

FIG. 9 is a perspective view of a turning tool according to a fourth embodiment.

FIG. 10 is a top view of the turning tool in FIG. 9.

FIG. 11 is a front view of the turning tool in FIG. 9.

FIG. 12 is a side view of the turning tool in FIG. 9.

FIG. 13 is a top view of the turning tool in FIG. 9 and a metal work piece.

FIG. 18 is a front view of the turning tool in FIG. 16.

FIG. 19 is a top view of the turning tool in FIG. 16.

Figure 1:
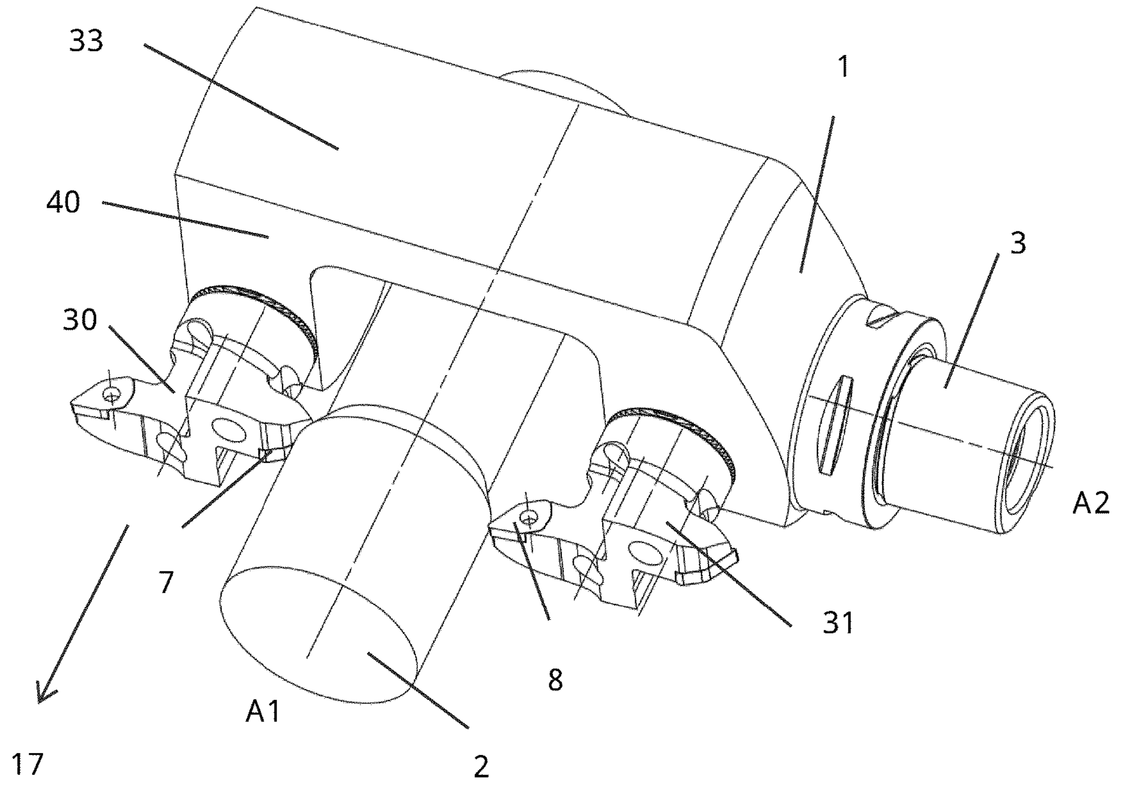
FIG. 1 is a perspective view of a turning tool according to a first embodiment and a metal work piece.

All turning tools in the figures are drawn to scale.

DETAILED DESCRIPTION OF EMBODIMENTS OF THE INVENTION

Reference is made to FIGS. 1-6 which show a turning tool 1 according to a first embodiment suitable for carrying out the above defined method. A metal work piece 2 is connected to a spindle (not shown) of a CNC-lathe (not shown) by clamping means (not shown). The turning tool 1 comprises a coupling portion 3 extending along a coupling axis A2. The coupling axis A2 defines a longitudinal axis of the turning tool 1. The forward direction is away from the coupling portion 3, i.e. the forward direction is substantially towards the left-hand side in FIG. 1. The rotational axis A1 of the metal work piece 2 is arranged perpendicular to and intersecting the coupling axis A2. The turning tool 1 comprises a first cutting element 7 in the form of a first turning insert 7 and a second cutting element 8 in the form of a second turning insert 8.

As seen in FIGS. 3-6, the first cutting element 7 comprises a first cutting edge 5 in the form of a first nose cutting edge 5, which separates and connects a first forward cutting edge 12 and the first rearward cutting edge 14. The second turning insert 8 comprises a second nose cutting edge 6 separating and connecting a second forward cutting edge 13 and a second rearward cutting edge 15.

Figure 2:
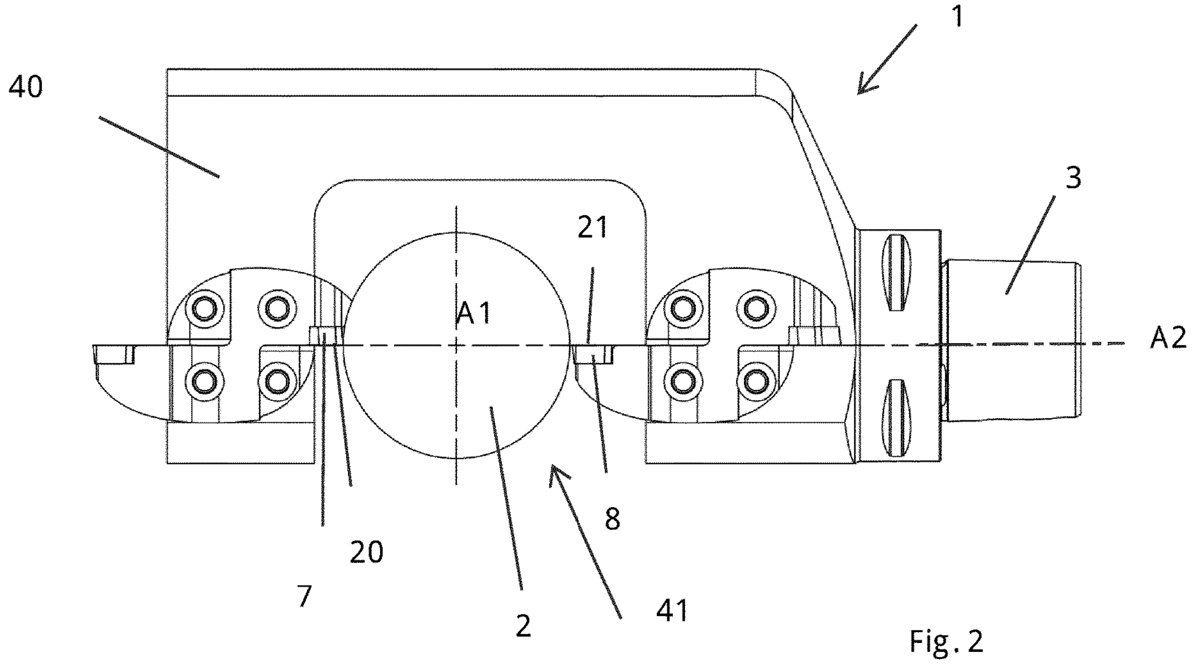
FIG. 2 is a side view of the turning tool and metal work piece in FIG. 1.
Figure 3:
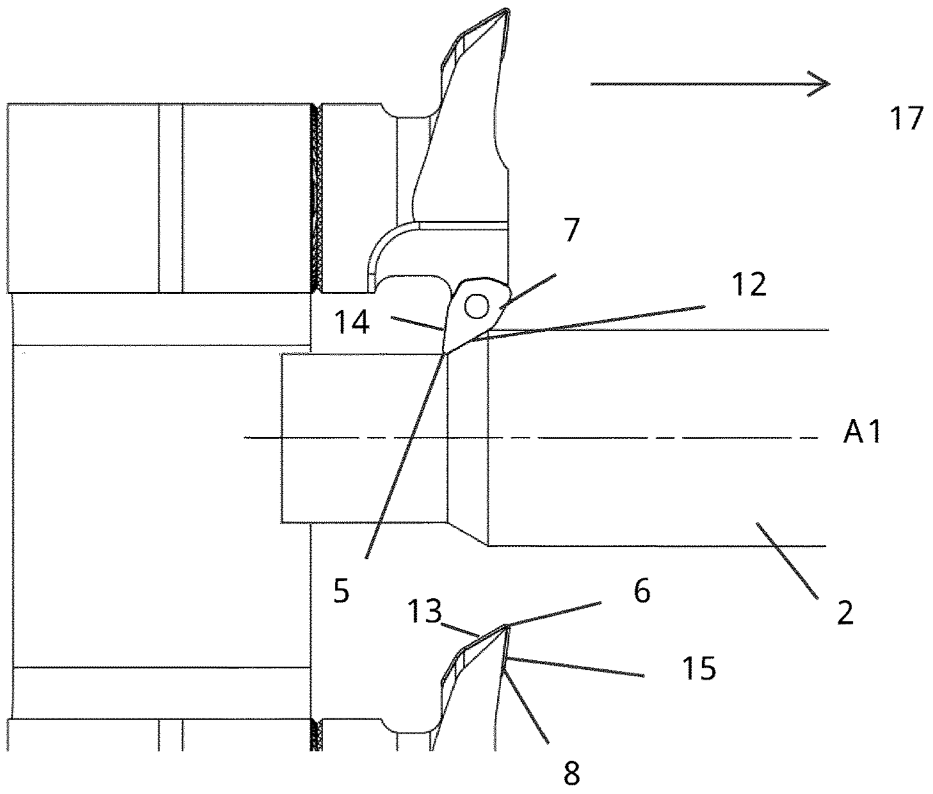
FIG. 3 is a schematic bottom view of a part of the turning tool and metal work piece in FIG. 1.
Figure 4:
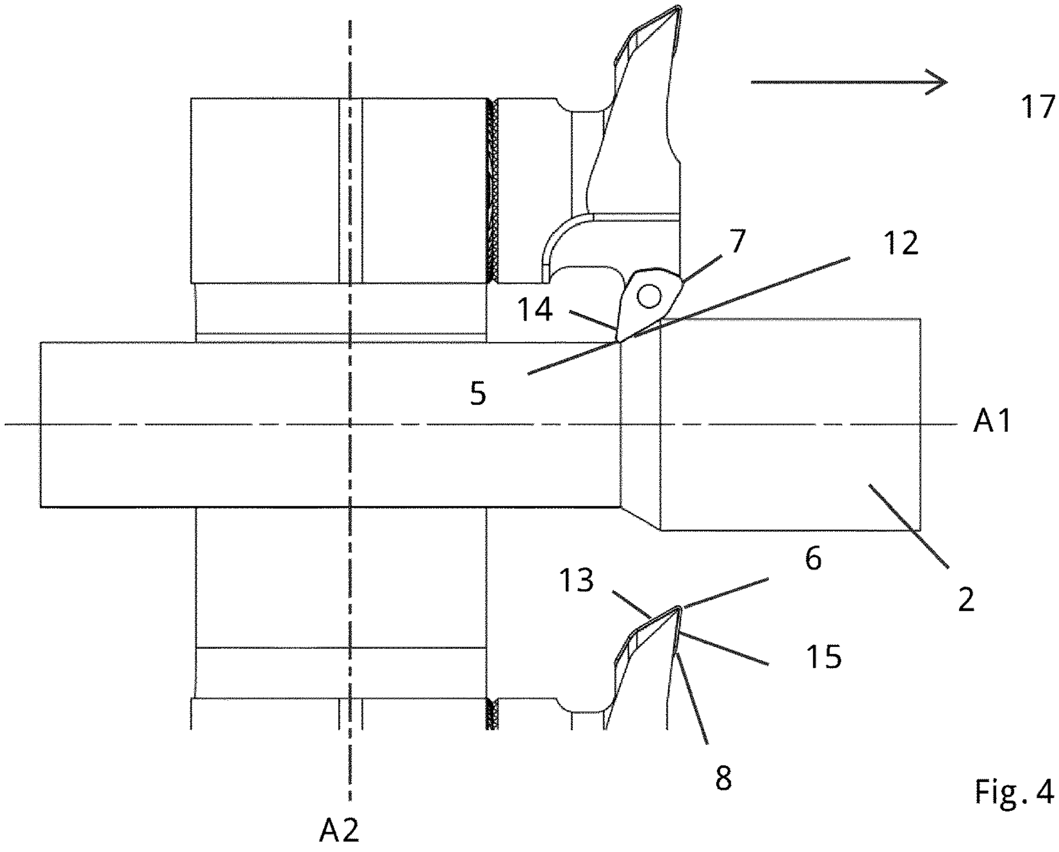
FIG. 4 is a further bottom view of a part of the turning tool and metal work piece in FIG. 1.

As seen in FIG. 2, the first turning insert 7 comprises a first top surface 20 and the second turning insert 8 comprises a second top surface 21. In FIG. 2, the metal work piece 2 rotates clock-wise around a rotational axis A1 thereof. The first cutting edge and the second nose cutting edge intersect or substantially intersect a plane comprising the coupling axis A2 and the rotational axis A1. In FIG. 2, the first turning insert 7 is in cut and the second turning insert 8 is only a very small distance from the metal work piece 2. Preferably, the distance between the metal work piece 2 and the inactive second turning insert 8 is greater, such as shown in FIGS. 3 and 4.

In FIGS. 1 and 2, the turning tool 1 comprises an intermediate portion 33 in the form of a concave portion 33 or curved portion, connecting the first and second turning inserts 7, 8. The intermediate portion 33 comprises an opening 41. The opening 41 or void or cavity makes room for a metal work piece to be machined. The concave portion 33 is curved around an axis perpendicular to the coupling axis A2, where said axis intersect said opening 41 or void or cavity. As can be seen in e.g. FIG. 2, the opening 41 opens radially in relation to the rotational axis A1. The turning tool 1 can be brought in the position as shown in FIG. 2 from above in FIG. 2, at least if the metal work piece 2 diameter is less than the distance between the first and second turning inserts 7, 8. This is an ad-vantage especially if the metal work piece 1 is long or is clamped at both ends.

The intermediate portion 33 comprises a first side surface 40 and an opposite second side surface. Due to the opening 41, the first side surface 40 does not surrounds or encloses the rotational axis A1. The first side surface 40 is extends in a plane which is perpendicular to the rotational axis A1. Said plane 40 is spaced apart from the coupling axis A2.

Protruding from the first side surface 40 are protruding portions 30, 31 in the form of replaceable cutting heads 30, 31, which are connected to the first side surface by clamping means. Each cutting head 30, 31 comprises at least one insert seat. The first and second turning inserts 7, 8 are connected to the first side surface 40 by means of a respective cutting heads 30, 31.

In FIG. 2, the rotational axis A1 is perpendicular to and intersecting the coupling axis A2. As seen in FIG. 2, the rotational axis A2 of the metal work piece 2 is between the first and second turning insert 7, 8. The coupling portion 3 comprises a tapered portion. The coupling portion 3 is quick-change coupling which in the industry is known as Coromant Capto®. In an alternative embodiment (not shown), the coupling portion 3 is square shaped in a cross section, and the coupling axis A2 is parallel to the coupling axis A2 in FIG. 2 and 5-20 mm below the coupling axis A2 in FIG. 2.

When the first turning insert 7 is seen in a top view, as in e.g. FIG. 3, a first nose angle defined as an angle between the first forward cutting edge 12 and the first rearward cutting edge 14 is acute.

When the second turning insert is seen in a top view, or in a bottom view as in e.g. FIG. 3, a second nose angle defined as an angle between the second forward cutting edge 13 and the second rearward cutting edge 15 is acute.

As seen in e.g. FIG. 1, a first through hole for a first screw (not shown) intersects the first top and first bottom surfaces, and a second through hole for a second screw (not shown) intersects the second top and first bottom surfaces.

FIGS. 3 and 4 show a first machining step where the turning tool 1 is moved in a first direction 17, perpendicular to the coupling axis A2. The first forward cutting edge 12 forms an acute first entering angle. The first rearward cutting edge 14 forms an obtuse first back clearance angle. The first turning insert 7 is in cut. The second turning insert 8 is spaced apart from the metal work piece 2. The second nose cutting edge 6 is in the first direction 17 ahead of the first nose cutting edge 5.

Figure 5:
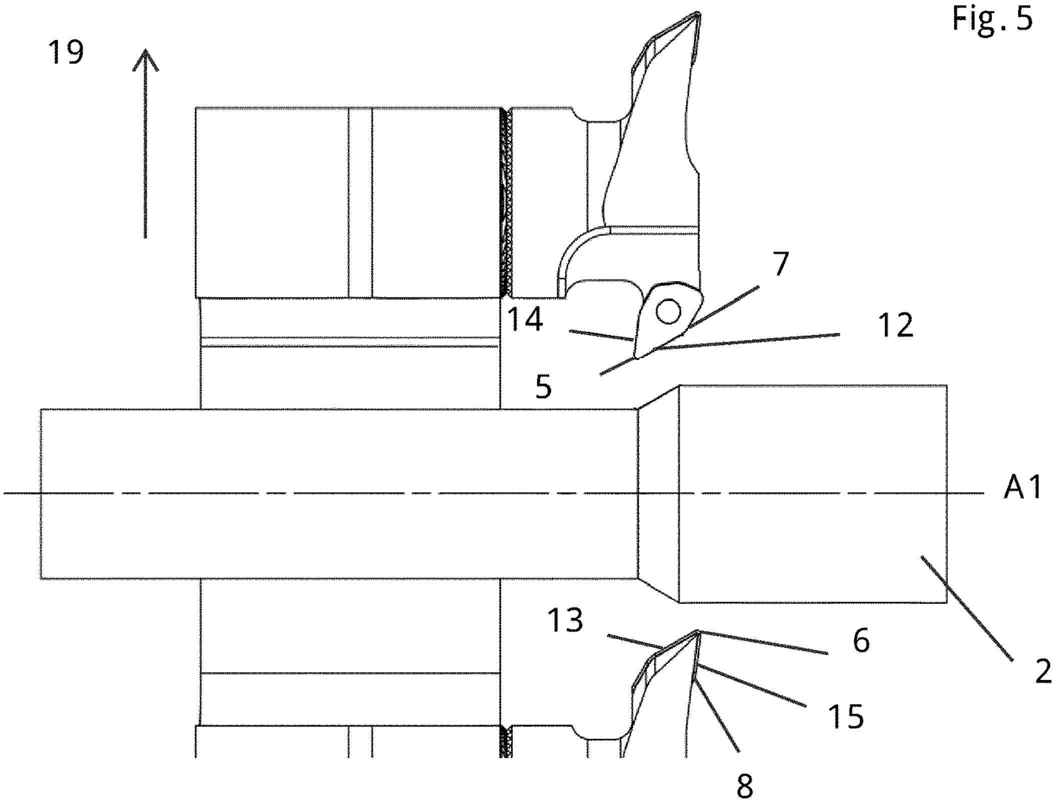
FIG. 5 is a yet a bottom view of a part of the turning tool and metal work piece in FIG. 1.

After the step shown in FIGS. 3 and 4, the first turning insert 7 goes out of cut, and the turning tool 1 is moved in a direction 19 such that the first cutting edge 5 is moved away from the metal work piece 2 and such that the second nose cutting edge 6 is moved towards the metal work piece 2, as shown in FIG. 5. The first turning insert 7 is moved radially away from the rotational axis A1 of the metal work piece 2.

Figure 6:
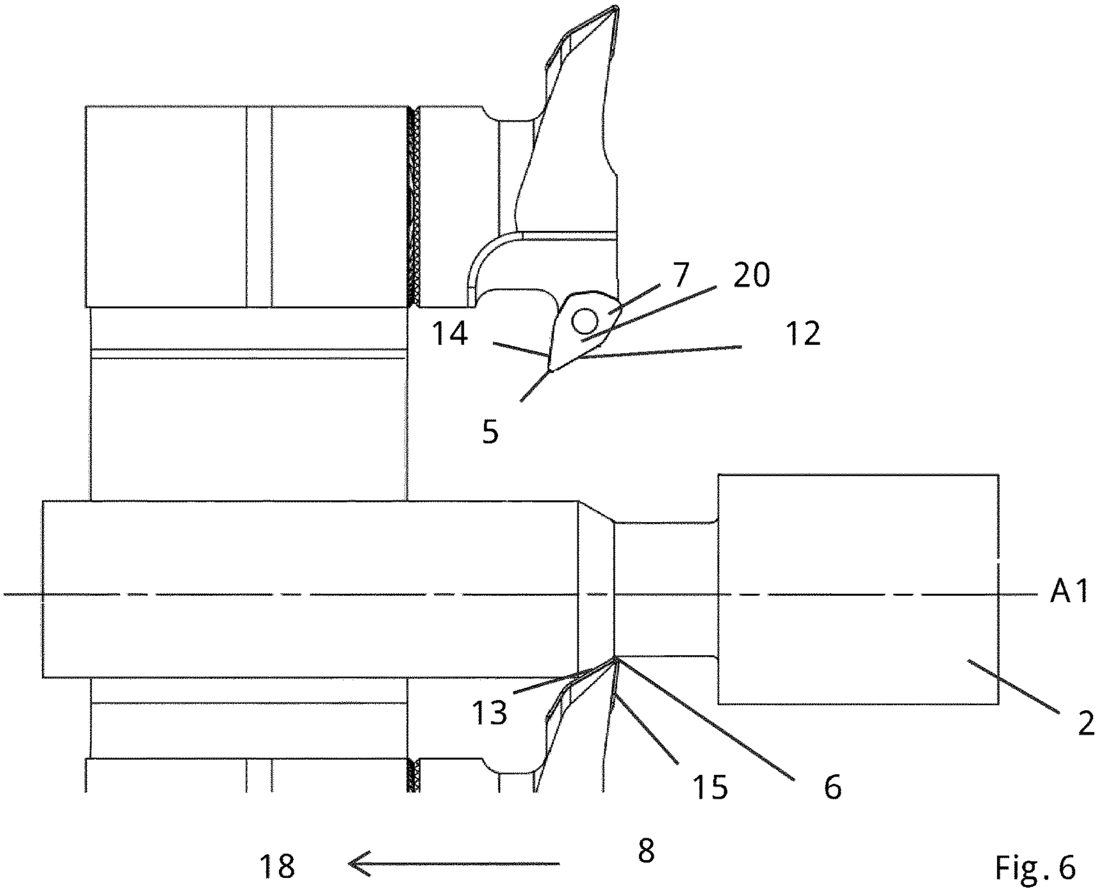
FIG. 6 is a yet a bottom view of a part of the turning tool and metal work piece in FIG. 1.

After the step shown in FIG. 5 follows the step shown in FIG. 6. FIG. 6 shows moving the turning tool 1 in a second direction 18, where the second direction 18 is in the opposite direction to the first direction 17 shown in FIGS. 4 and 5. The second turning insert 8 is in cut. The first turning insert 7 is inactive. In other words, the first turning insert is spaced apart from the metal work piece 2. The second forward cutting edge 13 forms an acute second entering angle. The second rearward cutting edge 15 forms an obtuse second back clearance angle.

The metal work piece 2 rotates in the same direction around the rotational axis thereof A1 in FIGS. 3, 4 and 6.

FIG. 7 shows a turning tool 1 according to a second embodiment. The only substantial difference between the turning tool 1 according to the first and second embodiments is that the turning tool 1 according to the second embodiment comprises a third turning insert 9. While indexing from the first turning insert 7 to the second turning insert 8 or vice versa is through a movement of the turning tool 1 along the coupling axis A2, indexing to the third turning insert 9 is through a movement of the turning tool in a direction perpendicular to the coupling axis A2, more specifically downwards in FIG. 2. As seen in FIG. 7, the first and second turning inserts 7, 8 as well as the third turning insert 9 intersect an imaginary circle or cylinder C1 having a center axis A3 thereof perpendicular to the coupling axis A2. The first turning insert 7 is inclined in relation to the second turning insert 8 by an inclination angle ω. The inclination angle ω is measured around the center axis A3 of the imaginary circle C1. The second top surface 21 is facing in a direction which is perpendicular to the coupling axis A2 and perpendicular or substantially perpendicular to the center axis A3 of the imaginary circle or cylinder C1.

FIG. 8 shows a turning tool 1 according to a third embodiment and a metal work piece 2. The only substantial difference between the turning tool 1 according to the second and third embodiments is that the turning tool 1 according to the third embodiment comprises a fourth turning insert 10 and that the intermediate portion 33 encloses the rotational axis A1. In other words, the intermediate portion does not comprise a radial opening.

Reference is now to FIGS. 9-15 which show a turning tool 1 according to a fourth embodiment. The turning tool 1 comprising a coupling portion 3. The coupling portion 3 extends along a coupling axis A2, defining a longitudinal axis of the turning tool 1. The coupling portion defines the rear end of the turning tool 1. The turning tool 1 comprises a first cutting element 7 in the form of a first turning insert 7 and a second cutting element 8 in the form of a second turning insert 8. As seen in e.g. FIG. 10 the first turning insert 7 comprises a first forward cutting edge 12, a first rearward cutting edge 14 and a first nose cutting edge 5. The first nose cutting edge 5 is the part of the first turning insert 7 which is closest to the coupling axis A2. The second turning insert 8 comprises a second nose cutting edge 6, a second forward cutting edge 13 and a second rearward cutting edge 15. A first nose angle defined as an angle between the first forward cutting edge 12 and the first rearward cutting edge 14 is acute. A second nose angle defined as an angle between the second forward cutting edge 13 and the second rearward cutting edge 15 is acute. As seen in e.g. FIG. 10, measured along or parallel to the coupling axis A2, the second nose cutting edge 6 is forward of the first cutting edge 5. Forward is defined as away from the coupling portion 3, towards the first and second turning inserts 7, 8.

As seen in e.g. FIG. 11, the first turning insert 7 comprises a first top surface 20 and an opposite first bottom surface. The second turning insert 8 comprises a second top surface 21 and an opposite second bottom surface. The first top surface 20 comprises a first rake surface, and the second top surface 21 comprises a second rake surface. As seen in FIG. 11 the first and second cutting inserts 7, 8 intersect an imaginary circle or cylinder C1 having a center axis A3 thereof which parallel to the coupling axis A2. The first turning insert 7 is inclined in relation to the second turning insert 8 by an inclination angle ω, where said inclination angle ω is measured around the center axis A3 of the imaginary circle C1. The first top surface 20 is facing in a direction which is perpendicular to or substantially perpendicular to the coupling axis.

As seen in e.g. FIG. 9, the turning tool 1 comprises a forward facing surface 42, i.e. a surface facing away from the coupling portion 3. Two elements 30, 31 in the form of replaceable cutting heads 30, 31 which protrude in the forward direction from the forward facing surface 42. The first cutting head 30 comprises the first turning insert 7, meaning that the first cutting head comprises an insert seat in which the first turning insert 7 is mounted. The second cutting head 31 comprises the second cutting element 8. The cutting heads 30, 31 are spaced apart from the coupling axis A2.

The coupling portion 3 defines the rear end of the turning tool 1 and is suitable for being insert into a machine interface (not shown) which preferably comprise a cavity or a recess (not shown). The coupling portion 3 shown in e.g. FIG. 9 comprises a substantially conical or substantially tapered or tapered portion. The coupling portion is in the field of metal cutting tools known as Coromant Capto®. Other types of coupling portions are possible, for example such known as square shank types. For example, if the coupling portion is of the square shank type, the cross section of the coupling portion, perpendicular to the coupling axis, is square shaped or rectangular shaped. Further, for such a turning tool, the coupling axis is parallel to and 5-20 mm below the coupling axis A2 in FIG. 12.

FIG. 13 shows a first machining step. A metal work piece 2 rotates in one direction around a rotational axis A1 thereof. The turning tool 1 is moved in a first direction 17 parallel to the coupling axis A2 and parallel to a rotational axis A1 of a metal work piece 2 thereof. The first direction 17 is a forward direction, i.e. in a direction away from the coupling portion 3 and in the direction which the forward facing surface 42 is facing. The top surface of the first turning insert 7 is facing the viewer in FIG. 13. A machined surface is formed by the first nose cutting edge 5, in other words the first nose cutting edge is a surface generating cutting edge. The first turning insert 7 is arranged such that the first forward cutting edge 12 forms an acute first entering angle α of 3-45°. The first rearward cutting edge 14 forms an obtuse first back clearance angle γ of 93°135°. The second turning insert 8 is spaced apart from the metal work piece 2.

When moving the turning tool 1 in the first direction 17, the second nose cutting edge 6 is ahead of the first nose cutting edge 5. As seen in FIG. 13, the turning tool 1 is arranged such that the metal work piece 2, which is cylindrical, is arranged between the first turning insert 7 and the second turning insert 8, wherein the rotational axis A1 which is a longitudinal axis A1 of the metal work piece (2) is between said turning inserts 7, 8.

Figure 14:
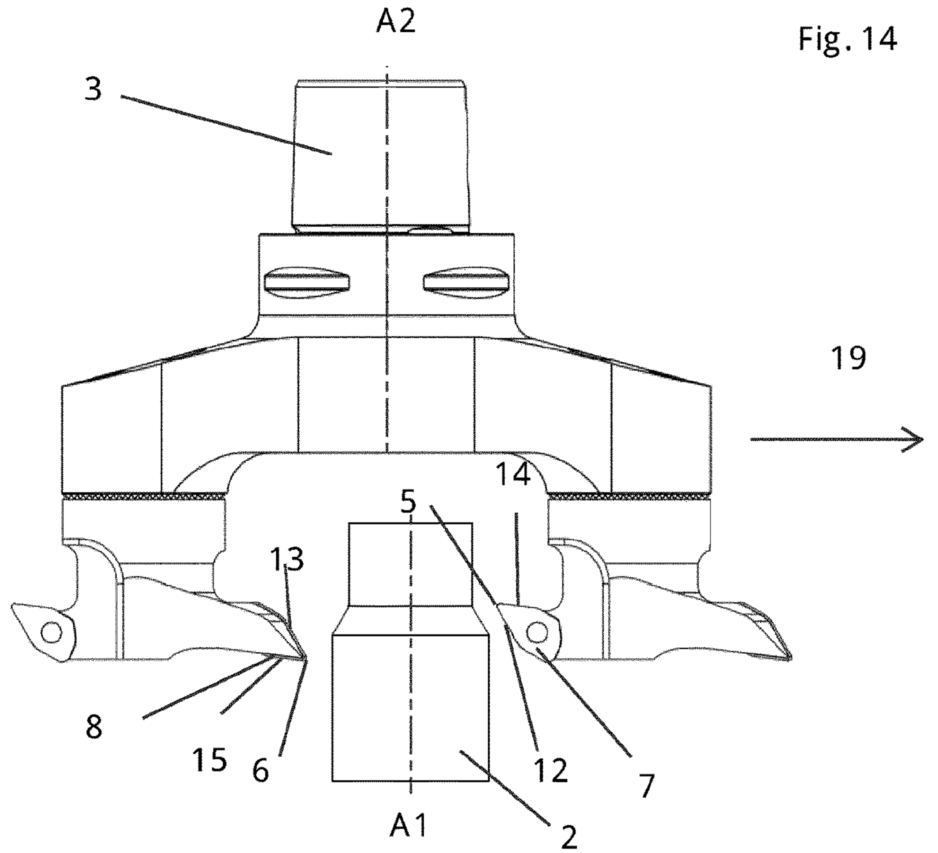
FIG. 14 is a further top view of the turning tool in FIG. 9 and a metal work piece.

FIG. 14 shows a step after the step shown in FIG. 13. The turning tool 1 is moved in a direction 19 such that the first nose cutting edge 5 is moved away from the metal work piece 2 and such that the second nose cutting edge 6 is moved towards the metal work piece 2. The turning tool 1 is moved in a direction 19 which is perpendicular to the coupling axis A2 and perpendicular to the rotational axis A1. Said movement is a linear movement.

Figure 15:
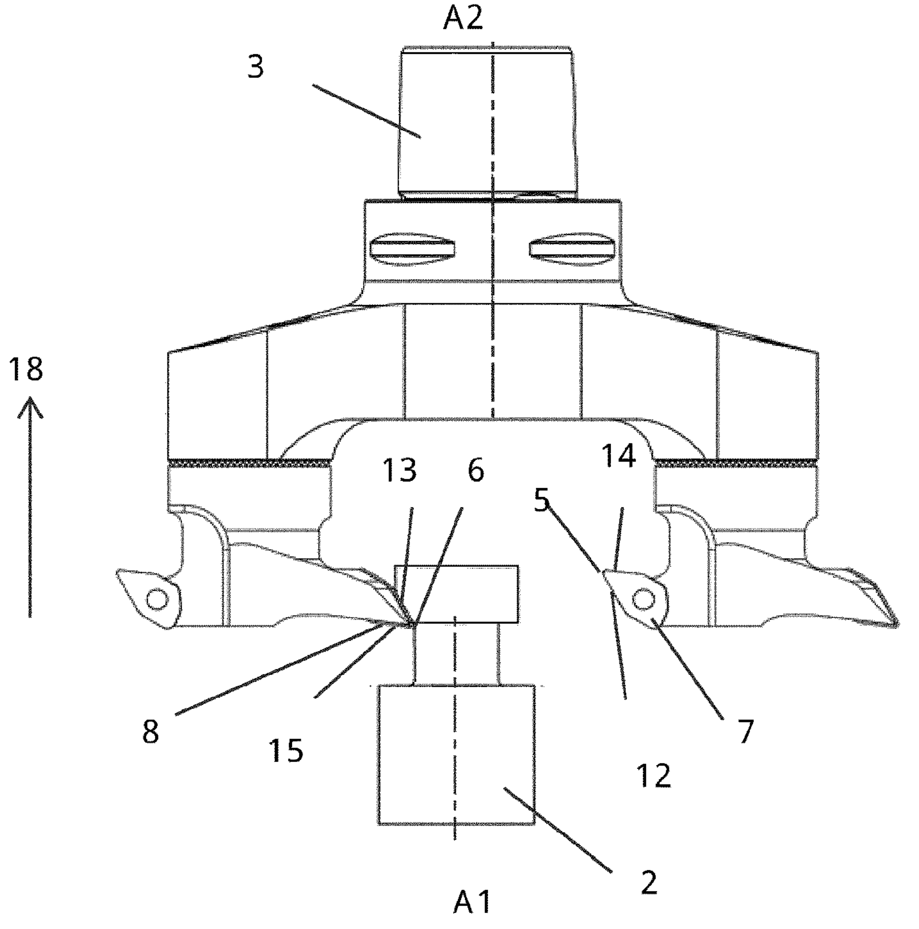
FIG. 15 is yet a top view of the turning tool in FIG. 9 and a metal work piece.
Figure 16:
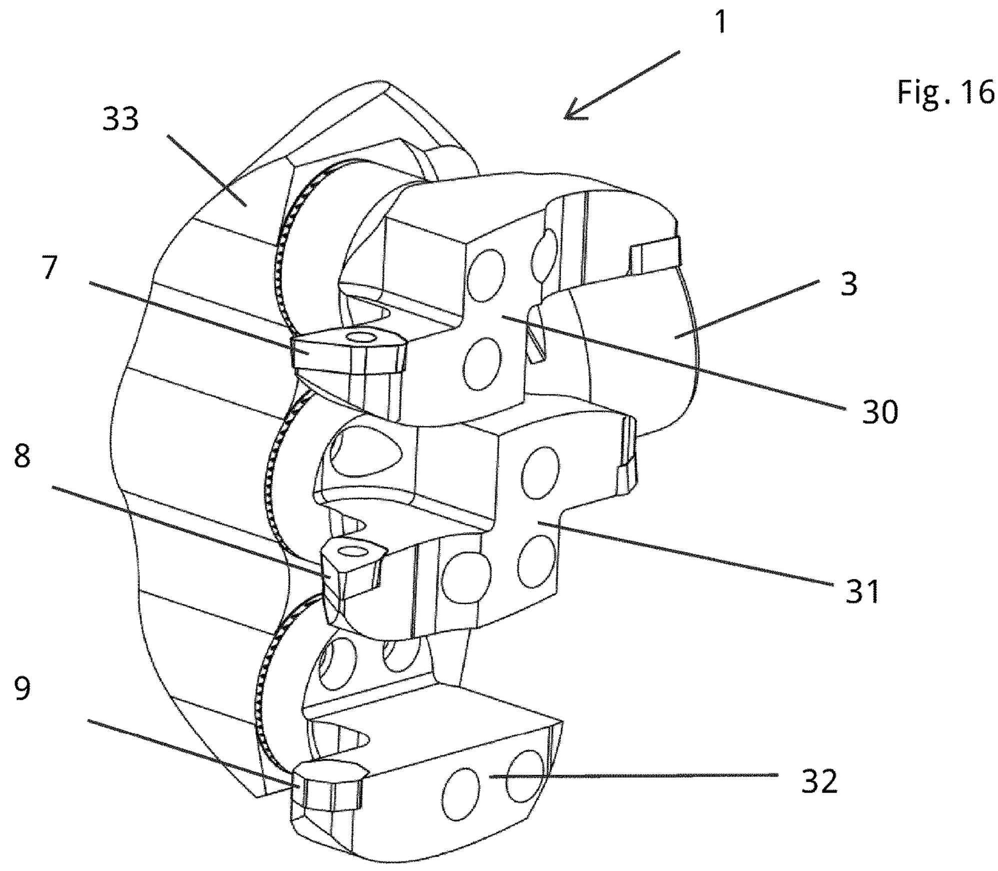
FIG. 16 is a perspective view of a turning tool according to a fifth embodiment.
Figure 17:
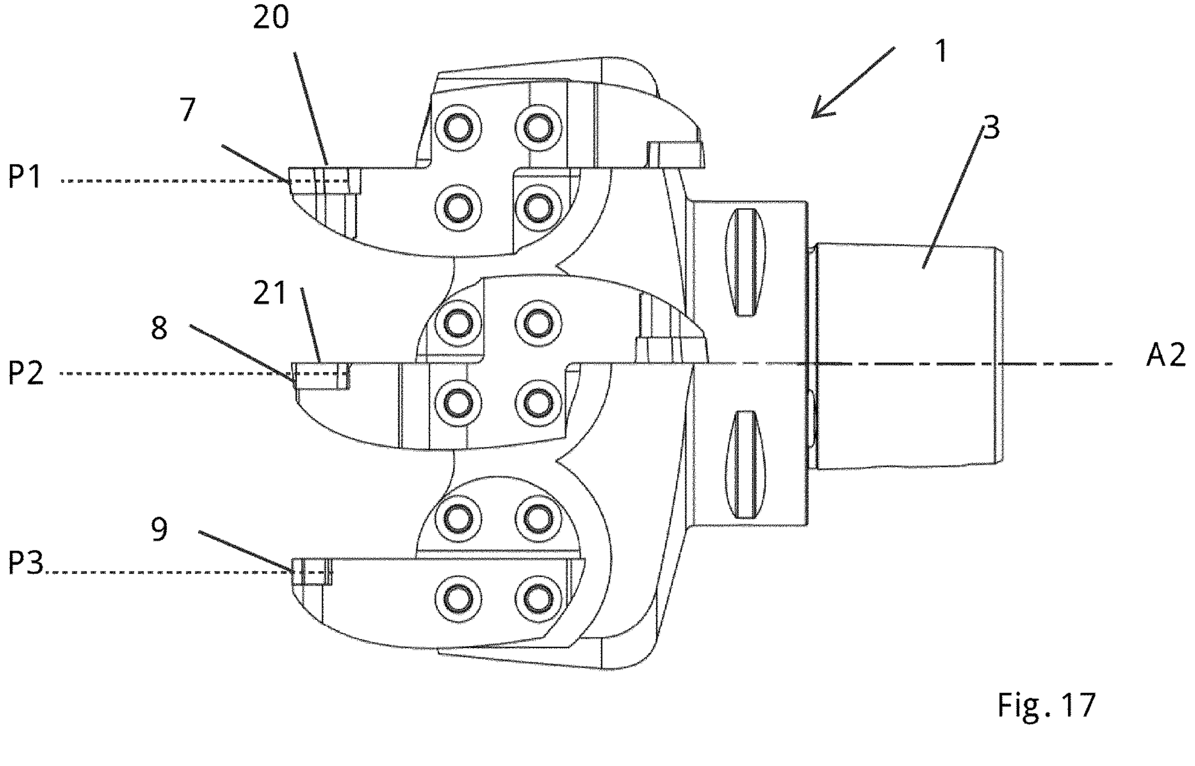
FIG. 17 is a side view of the turning tool in FIG. 16.

FIG. 15 shows a step which is after the step shown in FIG. 14. The turning tool 18 is moved in a second direction 18. The second direction 18 is in the opposite direction to the first direction 17. The second forward cutting edge 13 forms an acute second entering angle β of 3°45°. The second rearward cutting edge 15 forms an obtuse second back clearance angle δ of 93°135°. The first turning insert 7 is spaced apart from the metal work piece 2. The first nose cutting edge 5 is ahead of the second nose cutting edge 6 in the second direction 18. At least a portion of the surface machined by the first turning insert 7 in the first step, showed in FIG. 13, is machined by the second turning insert 8.

Reference is now made to FIGS. 16-23, which show a turning tool 1 according to a fifth embodiment. The turning tool 1 comprising a coupling portion 3. The coupling portion 3 extends along a coupling axis A2. The coupling axis A2 defines a longitudinal axis of the turning tool 1. The coupling portion 3 comprises a conical or substantially conical portion. In the example, the substantially conical portion is according to what is in the industry is known as Coromant Capto®. The coupling portion may have other shapes, such a shape which is square shaped or rectangular shaped in a cross section, where said cross section is perpendicular to the coupling axis.

The turning tool 1 comprises a first cutting element 7 in the form of a first turning insert 7, a second cutting element 8 in the form of a second turning insert 8, and a third cutting element 9 in the form of a third turning insert 9. The first turning insert 7 comprises a first cutting edge 5 in the form of a first nose cutting edge 5, a first forward cutting edge 12 and a first rearward cutting edge 14. The first nose cutting edge 5 separates and connects the first forward cutting edge 12 and the first rearward cutting edge 14. The first turning insert 7 comprises a first top surface 20 and an opposite first bottom surface. The second turning insert 8 comprises a second nose cutting edge 6, a second forward cutting edge 13 and a second rearward cutting edge 15. The second nose cutting edge 6 separating and connecting a second forward cutting edge 13 and a second rearward cutting edge 15. In other words, the second forward cutting edge 13 and a second rearward cutting edge 15 converge towards the second nose cutting edge 6. The second cutting element 8 comprises a second top surface 21 and an opposite second bottom surface.

A first mid-plane P1 extends mid-way or substantially mid-way between the first top surface 20 and the first bottom surface. The first mid-plane P1 is parallel to or substantially parallel to the first bottom surface. In a corresponding manner, the second turning insert 8 comprises a second top surface 21 and an opposite second bottom surface, wherein a second mid-plane P2 extends mid-way or substantially mid-way between the second top surface 21 and the second bottom surface. The third turning insert 9 is arranged in a corresponding manner, having a third mid-plane P3 mid-way between a top and a bottom surface thereof. Said top surfaces 20, 21 are suitable to function as rake surfaces. The first, second and third mid-planes P1, P2, P3 extends in parallel or substantially parallel planes. As seen in e.g. FIG. 17, the first top surface 20 and the second top surface 21 are facing in the same or substantially the same direction, which is upwards in FIG. 17.

As seen in FIG. 18, a distance from the coupling axis A2 to the second nose cutting edge is greater than a distance from the coupling axis A2 to the first nose cutting edge 5. Said distances are measured horizontally in FIG. 18. In other words, said distance from a first plane comprising the coupling axis, wherein said first plane is perpendicular to the first mid-plane. Thus, said distances are from said first plane and to the first nose cutting edge 5 and to the second nose cutting edge 6. In a top view, as seen in FIG. 19 and in FIG. is a magnified view of section B in FIG. 19, a first bisector between the first forward cutting edge 12 and the first rearward cutting edge 14 forms an angle of 45-90° in relation to a second bisector between the second forward cutting edge 13 and the second rearward cutting edge 15. It can also be seen that the first rearward cutting edge 14 and the second rearward cutting edge 15 forms an angle of 6-20° in relation to each other. Further, a distance from the first forward cutting edge 12 to the second forward cutting edge 13 is shorter than a distance from the first forward cutting edge 12 to the second rearward cutting edge 15. A first nose angle defined as an angle between the first forward cutting edge 12 and the first rearward cutting edge 14 is acute. A second nose angle defined as an angle between the second forward cutting edge 13 and the second rearward cutting edge 15 is acute. In e.g. FIG. 19 the first nose cutting edge 5 and the second nose cutting edge 6 are longitudinally at an equal or substantially equal distances. The first nose cutting edge 5 and/or the second nose cutting edge 6 is the longitudinally most distal part of the turning tool 1, where longitudinally is defined as along the coupling axis or along axii parallel to the coupling axis A2.

Figure 20:
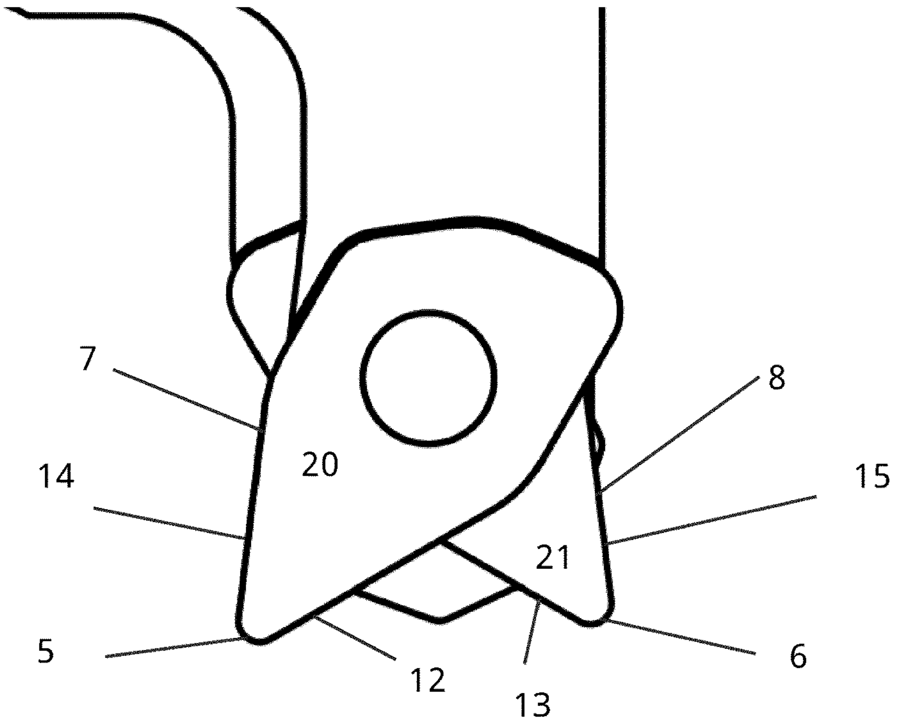
FIG. 20 is a magnified view of section B in FIG. 19.

In FIG. 20 the first turning insert 7 and the second turning insert 8 partially overlap in a top view.

Figure 21:
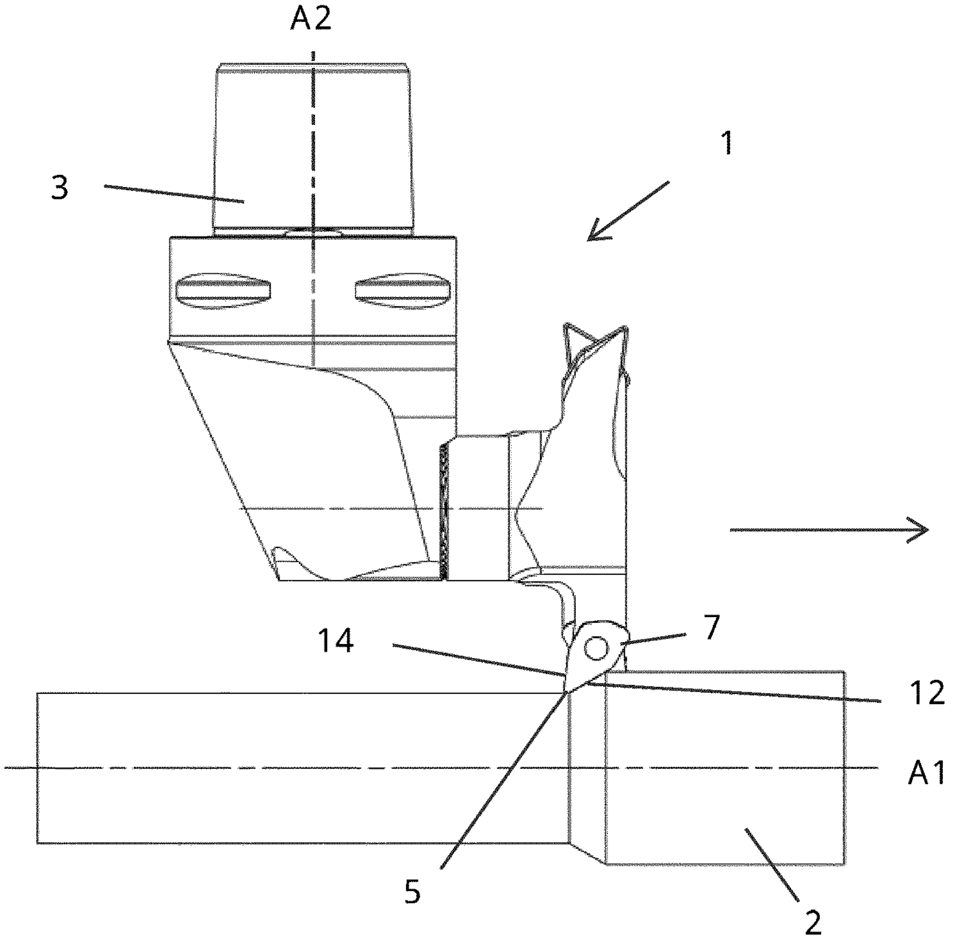
FIG. 21 is a top view of the turning tool in FIG. 16 and a metal work piece.

FIG. 21 show an example of a first step of a turning method for a CNC-lathe (not shown). A metal work piece 2 is rotating in one direction 50 around a rotational axis A1 thereof. The coupling portion 3 of the turning tool 1 is connected to the CNC-lathe (not shown), more specifically the coupling portion is connected to a machine interface. The coupling axis A2 is perpendicular to the rotational axis A1. The turning tool 1 is moved in a first direction 17 such that the first nose cutting edge 5 is in cut and such that the first forward cutting edge forms an acute entering angle. The first rearward cutting edge 14 forms an obtuse back clearance angle. The second and third turning inserts 8, 9 are spaced apart from the metal work piece 2. The second nose cutting edge is ahead of the first nose cutting edge 5 in the first direction 17. The first direction is parallel to the rotational axis A1.

Figure 22:
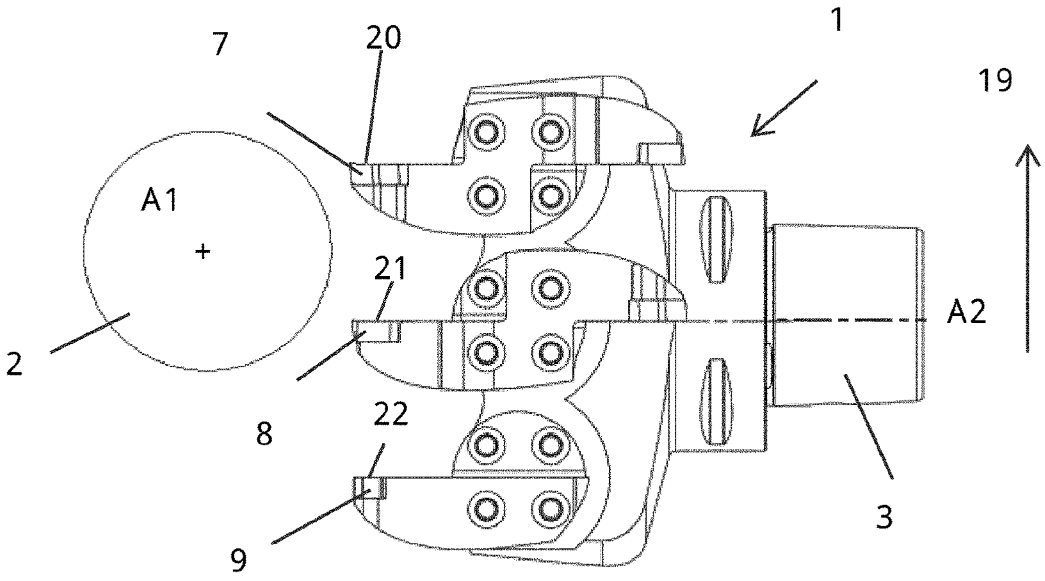
FIG. 22 is a side view of the turning tool in FIG. 16 and a metal work piece.

After the first step, the turning tool 1 is moved in a direction 19 perpendicular to the coupling axis A2 and perpendicular to the rotational axis A1, as seen in FIG. 22. Said direction is in the same direction or substantially the same direction as the first top surface 20 is facing. Said direction is not radially in relation to the rotational axis A1 but rather tangential in relation to the metal work piece 2. Said movement od the turning tool 1 is a linear movement, where the first nose cutting edge is moved further away from the metal work piece 2 and such that the second nose cutting edge 6 is moved closer to or towards the metal work piece 2. None of the first, second or third cutting inserts 7, 8, 9 are in cut.

Figure 23:
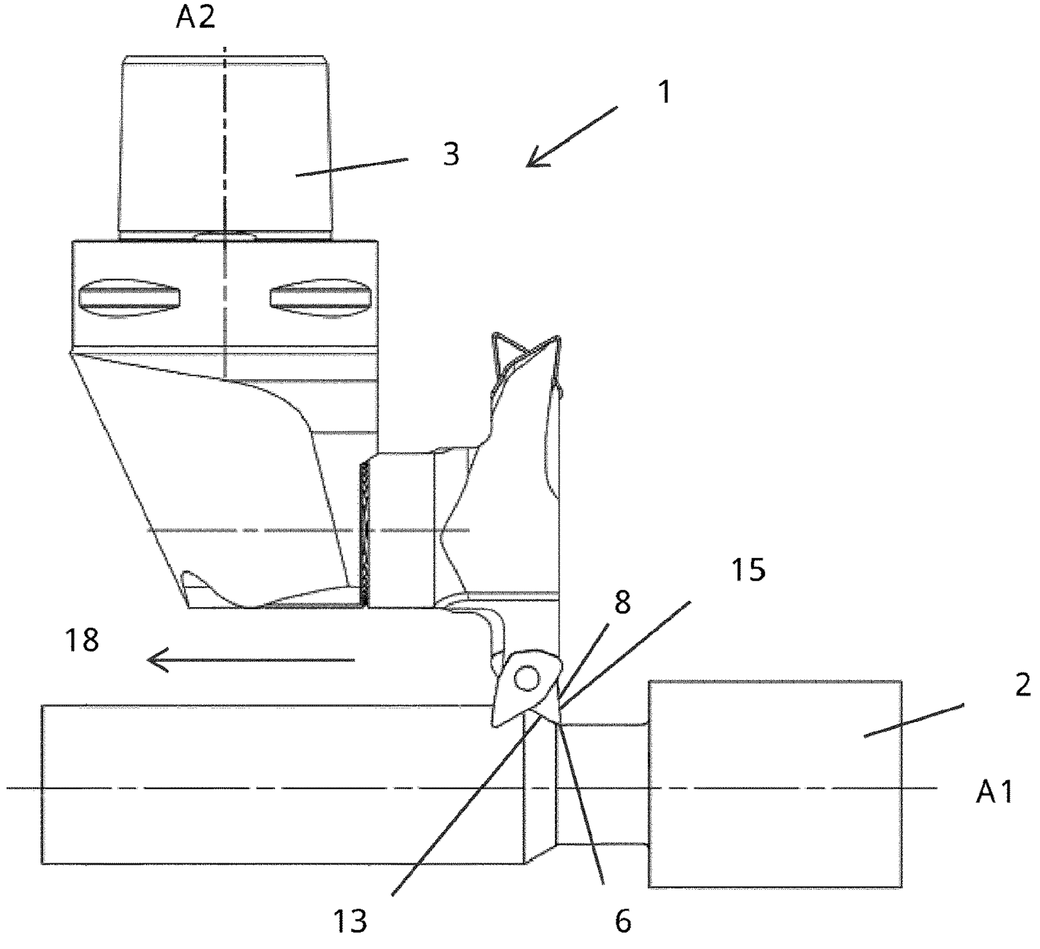
FIG. 23 is a top view of the turning tool in FIG. 16 and a metal work piece.

FIG. 23 show a further step, which is after the step shown in FIG. 22. The turning tool 1 moved in a second direction 18 such that the second forward cutting edge 13 is in cut at an acute second entering angle δ which is 5-45°. A machined surface is formed by the second nose cutting edge 6. The second direction 18 is in the opposite direction or substantially opposite direction to the first direction 17. The second rearward cutting edge 15 forms an obtuse back clearance angle. The first nose cutting edge is ahead of the second nose cutting edge 6 in the second direction. The first and third turning inserts 7, 9 are spaced apart from the metal work piece 2. At least a portion of the machined surface resulting from the step shown in FIG. 21 is machined in the step shown in FIG. 23.

The metal work piece can have a different shape compared to what has been described above. The metal work piece may be in the form of a bar, a hollow bar or any other shape which has a rotational symmetry or substantially has a rotationally symmetry around a rotational axis thereof. The shape which can be machined can be of different configurations than what have been described above. For example, the shape can have not only one, but two side walls, i.e. surfaces which is in a plane perpendicular to the rotational axis. In other words, the turning tool can be used to machine an external groove.

Figure 24:
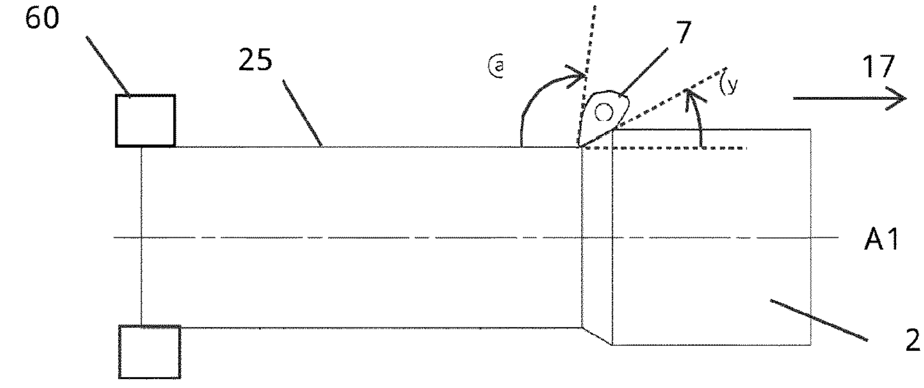
FIG. 24 is a schematic figure of moving a turning tool in a first direction.

FIG. 24 is a schematic figure of moving a turning tool in a first direction 17 where the first cutting element 7 is in cut. The first direction 17 is a feed direction. The first forward cutting edge forms a first entering angle α which is 5-45°, and the first rearward cutting edge forms an obtuse back clearance angle γ of at least 91°. The second cutting element 8 is spaced apart from the metal work piece 2. A machined surface 25 is formed by the first cutting element 7. More specifically, the surface 25 is formed by the first nose cutting edge 5.

Figure 25:
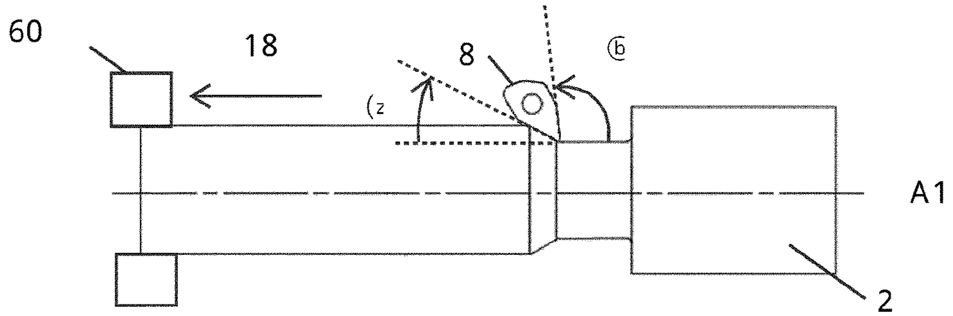
FIG. 25 is a schematic figure of moving a turning tool in a second direction.

FIG. 25 is a schematic figure of moving a turning tool in a second direction 18 where the second cutting element 8 is in cut. The second direction is a feed direction. The second forward cutting edge is in cut at a second entering angle δ which is 5-45°, and the second rearward cutting edge forms an obtuse back clearance angle δ. At least a portion of a surface 25 machined when moving the turning tool 1 in the first direction 17, seen in FIG. 24, is machined by means of the second cutting element 8 in FIG. 25, as well as in FIG. 26.

Figure 26:
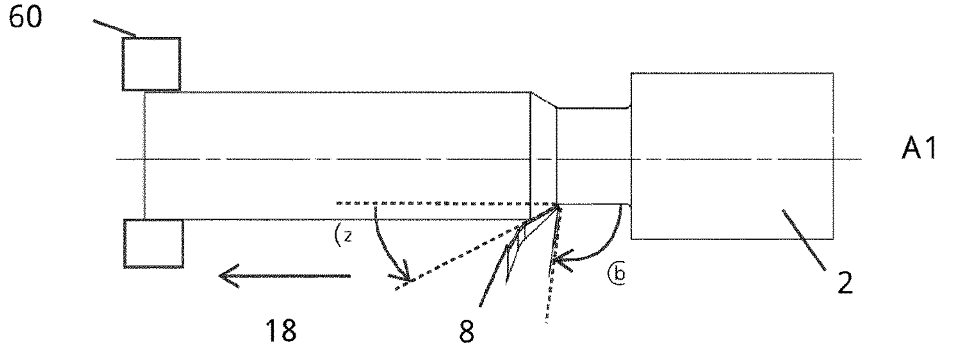
FIG. 26 is a further schematic figure of moving a turning tool in a second direction.

FIG. 26 is a further schematic figure of moving a turning tool in a second direction 18 where the second cutting element 8 is in cut. The second forward cutting edge is in cut at a second entering angle β which is 5-45°, and the second rearward cutting edge forms an obtuse back clearance angle δ. The second bottom surface is facing the viewer.

FIG. 24 show a first machining step, which can be followed by a step showed in either FIG. 25 or FIG. 26. If the turning tool is according to the fifth embodiment, the step shown in FIG. 25 applies, while if the turning tool is according to the first, second, third or fourth embodiments, the step shown in FIG. 26 applies. In FIG. 25, the second cutting element 8 is on the same side of the rotational axis A1 as the first cutting element 7 in FIG. 24, and the first top surface is facing the same direction as the second top surface. In contrast, in FIG. 26, the second cutting element 8 is on the opposite side of the rotational axis A1 as the first cutting element 7 in FIG. 24, and the first top surface is facing the opposite direction as the second top surface.

The metal work piece 2 in FIGS. 24-26 is clamped by clamping means 60 at one end. Said clamping means 60 are connected to and driven by a rotating or rotatable spindle (not shown), which are part of a CNC-lathe (not shown). Said clamping means may be in the form of e.g. a collet chuck, a 3-jaw chuck or a face driver. A distance from the clamping means 60 to the second nose cutting edge 6 is shorter than a distance from the clamping means 60 to the first cutting edge 5, where said distances are measured along lines parallel to the rotational axis A1. In FIGS. 24-26, the first direction 17 is away from the clamping means 60, and the second direction 18 is towards the clamping means. Alternatively (not shown), the first direction 17 is towards the clamping means 60, and the second direction 18 is away from the clamping means. The first and second directions 17, 18 are thus in opposite directions along the rotational axis A1. Opposite directions can thus be understood as towards or away from the clamping means or towards or away from one longitudinal end of the metal work piece. The first and second directions are thus not necessarily linear and parallel to the rotational axis.

Figure 27:
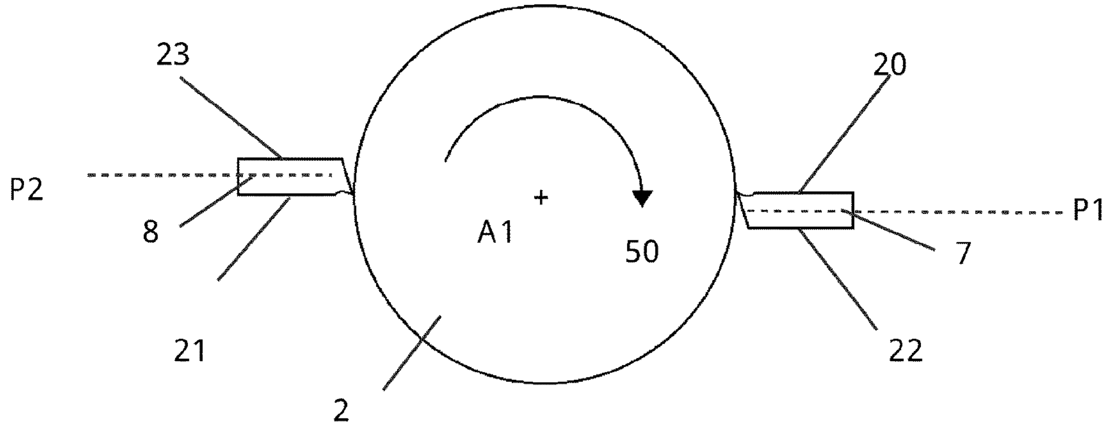
FIG. 27 is a schematic figure showing a first cutting element, a second cutting element and a rotating metal work piece in a cross section.

FIG. 27 is a schematic figure showing a first cutting element 7 in the form of a first turning insert 7, a second cutting element 8 in the form of a second turning insert 8 and a rotating metal work piece in a cross section. The first and second turning inserts 7, 8 are arranged according to the first, second, third or fourth turning tool embodiments. The first turning insert 7 comprises a first top surface 20 and a first bottom surface 22, both are horizontal or substantially horizontal. The second cutting insert 8 comprises second top surface 21 and a second bottom surface 23, both are horizontal or substantially horizontal. A first mid plane P1 is mid-way or substantially mid-way between the first top surface 20 and the first bottom surface 22. The first mid-plane P1 is parallel to or substantially parallel to the first bottom surface 22. The second mid plane P2 is arranged in a corresponding manner. The first and second mid planes P1, P2 are arranged in parallel planes. The metal work piece 2 rotates in one direction 50 around a rotational axis A1 thereof. The first and second turning inserts 7, 8 are located on opposite sides of the rotational axis A1. The first top surface 20 is facing upwards in the figure, and the second top surface 21 is facing downwards in the figure. When the first turning insert 7 is in cut, the second turning insert 8 is spaced apart from the metal work piece 2.

FIGS. 25 and 26 show how the second direction 18 is in a direction away from a corner of the metal work piece 2. In other words, the second direction 18 is in a direction away from a surface which is in a plane perpendicular to the rotational axis A1. Said corner, or a shoulder, is the intersection between a surface concentric with the rotational axis, and a second surface perpendicular to the rotational axis. Said corner is a 90° corner. Said corner is preferably completely formed by the second cutting element, where the turning tool is moved towards the rotational axis A1, immediately prior to moving the turning tool in the second direction 18.

The first and second turning inserts 7, 8 described in the embodiments above are preferably made from a wear resistant material, preferably cemented carbide. The first and second top surfaces 20, 21 preferably comprises chip forming means or chip breaking means (not shown). Preferably, a distance from at least a portion of said chip forming means or chip breaking means to the mid-plane of the respective turning insert is greater than a distance from the cutting edge bordering to the top surface to said mid-plane. In other words, the top surfaces 20, 21 of the first and second turning inserts comprises at least one protrusion, which in a side view is higher than or above the cutting edge. In such a way, the turning inserts are more suitable for turning.

The first and second turning inserts 7, 8 described in the embodiments above are preferably designed such that the first forward cutting edge 12 is sloping downwards, i.e. towards the first bottom surface 22, at increasing distance from the first nose cutting edge 5. The second forward cutting edge 13 is preferably arranged in a corresponding manner. In such a way, the chip control is further improved.

The forward and rearward cutting edges are forward and rearward in the respective feed directions, not necessarily forward or rearward in relation to forward or rearward directions of the turning tool itself.

The invention claimed is:

1. A turning method for a CNC-lathe, comprising the steps of:

providing a metal work piece;

providing a turning tool, wherein the turning tool includes a coupling portion, wherein the coupling portion extends along a coupling axis, wherein the turning tool has a first cutting element and a second cutting element, wherein the first cutting element includes a first cutting edge, wherein the second cutting element has a second nose cutting edge separating and connecting a second forward cutting edge and a second rearward cutting edge;

rotating the metal work piece in one direction around a rotational axis thereof;

moving the turning tool in a first direction such that the first cutting edge is in cut;

moving the turning tool in a direction such that the first cutting edge is moved away from the metal work piece and such that the second nose cutting edge is moved towards the metal work piece; and moving the turning tool in a second direction such that the second forward cutting edge is in cut at an entering angle which is 5-45°, wherein the second direction is in an opposite direction or substantially opposite direction from the first direction.

2. The turning method according to claim 1, wherein the first cutting element includes a first forward cutting edge and a first rearward cutting edge, the first forward cutting edge being forward and the first rearward cutting edge being rearward relative to the first direction, wherein the first cutting edge is a first nose cutting edge, wherein the first nose cutting edge separates and connects the first forward cutting edge and the first rearward cutting edge, wherein as the turning tool is moved in the first direction, the first forward cutting edge forms a first entering angle which is 5-45°.

3. The turning method according to claim 1, wherein as the turning tool is moved in the second direction, the second rearward cutting edge forms an obtuse back clearance angle.

4. The turning method according to claim 2, wherein as the turning tool is moved in the first direction, the first rearward cutting edge forms an obtuse back clearance angle.

5. The turning method according to claim 3, wherein moving the turning tool in the second direction includes turning at least a portion of a surface machined as the turning tool is moved in the first direction.

6. The turning method according to claim 1, wherein the step of moving the turning tool in the direction such that the first cutting edge is moved away from the metal work piece and such that the second nose cutting edge is moved towards the metal work piece, is without rotation of the turning tool around the coupling center axis.

7. The turning method according to claim 1, wherein the coupling axis is parallel to or perpendicular to the rotational axis.

8. The turning method according to claim 1, wherein the metal work piece is clamped by a clamping device, and wherein a distance from the clamping device to the second nose cutting edge is shorter than a distance from the clamping device to the first cutting edge.

9. The turning method according to claim 1, wherein the second nose cutting edge is in the first direction ahead of the first cutting edge along the rotational axis as the turning tool is moved in the first direction, and wherein the first cutting edge is in the second direction ahead of the second nose cutting edge along the rotational axis as the turning tool is moved in the second direction.

10. The turning method according to claim 1, wherein the second direction is in a direction away from a corner of the metal work piece.

11. The turning method according to claim 1, further comprising the step of turning in a third direction such that the second forward cutting edge is active at an obtuse entering angle, wherein the third direction is towards the rotational axis.

12. The turning method according to claim 1, wherein the first cutting element is a first turning insert, wherein the second cutting element is a second turning insert, wherein the first turning insert has a first top surface and a first bottom surface, wherein the first top surface and the first bottom surface are connected by a first side surface, wherein the second turning insert includes a second top surface and a second bottom surface, wherein the second top surface and the second bottom surface are connected by a second side surface, and wherein the first top surface and the second top surface includes chip breaking means.

13. The turning method according to claim 1, wherein the coupling portion is square or rectangular in a cross section or includes a conical or substantially conical portion.

14. The turning method according to claim 1, further comprising the step of arranging the turning tool such that the metal work piece is between the first cutting edge and the second nose cutting edge.

15. A computer program having instructions, which when executed by a CNC-lathe, causes the CNC-lathe to perform the steps according to claim 1.

* * * * *